(12) United States Patent
Krystofik

(10) Patent No.: US 11,210,685 B2
(45) Date of Patent: Dec. 28, 2021

(54) SYSTEM AND METHOD FOR MULTI-CHANNEL DIGITAL MARKETING OPTIMIZATION

(71) Applicant: Intellisea LLC, Mckinney, TX (US)

(72) Inventor: Joseph Byron Krystofik, Mckinney, TX (US)

(73) Assignee: INTELLISEA LLC, McKinney, TX (US)

( * ) Notice: Subject to any disclaimer, the term of this patent is extended or adjusted under 35 U.S.C. 154(b) by 0 days.

(21) Appl. No.: 15/929,678

(22) Filed: May 15, 2020

(65) Prior Publication Data

US 2021/0357961 A1 Nov. 18, 2021

(51) Int. Cl.
G06Q 30/00 (2012.01)
G06Q 30/02 (2012.01)
G06K 9/62 (2006.01)

(52) U.S. Cl.
CPC ....... *G06Q 30/0204* (2013.01); *G06K 9/6221* (2013.01); *G06Q 30/0276* (2013.01); *G06Q 30/0282* (2013.01)

(58) Field of Classification Search
CPC ........... G06Q 30/0204; G06Q 30/0276; G06Q 30/0282; G06K 9/6221
See application file for complete search history.

(56) References Cited

U.S. PATENT DOCUMENTS

| 1,051,538 | A | 1/1913 | Barcus | |
|---|---|---|---|---|
| 8,078,617 | B1 * | 12/2011 | Neveitt | G06Q 30/00 707/732 |
| 9,213,984 | B2 | 12/2015 | Karlsson | |
| 9,501,530 | B1 * | 11/2016 | Jacobsson | G06F 16/951 |
| 9,760,910 | B1 * | 9/2017 | Tuchman | G06Q 30/0269 |
| 9,904,930 | B2 | 2/2018 | Ogawa | |
| 9,996,853 | B2 | 6/2018 | Myers | |
| 10,332,042 | B2 | 6/2019 | Symons | |
| 2002/0184043 | A1 * | 12/2002 | Lavorgna, Jr. | G06F 16/972 715/234 |
| 2005/0065967 | A1 * | 3/2005 | Schuetze | G06F 16/88 |
| 2007/0027901 | A1 * | 2/2007 | Chan | G06Q 30/0277 |
| 2009/0006360 | A1 * | 1/2009 | Liao | G06F 16/284 |
| 2010/0076812 | A1 | 3/2010 | Ghosh | |

(Continued)

*Primary Examiner* — Sun M Li
(74) *Attorney, Agent, or Firm* — Sagacity Legal, PLLC

(57) ABSTRACT

A system for multi-channel digital marketing optimization includes a memory for storing a marketing optimization program code, and a marketing optimization data; and a processor communicatively coupled to the memory. The processor executes the marketing optimization program code to create a cluster template by creating and storing within the marketing optimization data an individual business template for each of a plurality of businesses, classifying the plurality of businesses into a cluster based at least in part on one or more marketing objectives, creating and storing within the marketing optimization data a cluster template based at least in part on a combination of captured and calculated data for the plurality of businesses within the cluster. The processor executes the marketing optimization program code further to repeat the cluster template creation steps for a plurality of clusters; and to mathematically combine the cluster templates to create a plurality of target marketing templates.

23 Claims, 29 Drawing Sheets

(56) References Cited

U.S. PATENT DOCUMENTS

| | | |
|---|---|---|
| 2013/0226691 A1 | 8/2013 | Chatow |
| 2014/0279078 A1* | 9/2014 | Nukala ............. G06Q 30/0276 |
| | | 705/14.73 |
| 2014/0330638 A1 | 11/2014 | Mierle |
| 2015/0058119 A1* | 2/2015 | Atli ................... G06Q 30/0276 |
| | | 705/14.49 |
| 2015/0186924 A1 | 7/2015 | Chittilappilly |
| 2016/0156579 A1* | 6/2016 | Kaufmann ............. H04L 51/22 |
| | | 709/206 |
| 2018/0189822 A1* | 7/2018 | Kulkarni ................ G06Q 50/01 |
| 2019/0251593 A1* | 8/2019 | Allouche ........... G06Q 30/0269 |

* cited by examiner

| TEMPLATE TYPE 416 | INDUSTRY 504 | CLUSTER 502 | MARKETING CHANNEL 108 | MARKETING CHANNEL VARIABLE 806 |
|---|---|---|---|---|
| INDIVIDUAL BUSINESS 802 | INDUSTRY a | A | GOOGLE SEARCH TEXT TO CALL | GOOGLEA |
| INDUSTRY LEVEL 420 | INDUSTRY a | A | GOOGLE SEARCH TO CALL | GOOGLEA |
| OBJECTIVE CLUSTER LEVEL 418 | — | A | GOOGLE SEARCH TEXT TO CALL | GOOGLEA |

| VARIABLE RATIO SPEND | CALL CONVERSIONS | EMAIL CONVERSIONS | SALE CONVERSIONS | TOTAL CONVERSIONS | CALL ROI | EMAIL ROI | SALE ROI | TOTAL AVG. ROI |
|---|---|---|---|---|---|---|---|---|
| E.G. 30% | E.G. 10 | E.G. 1 | E.G. 0 | 11 | $50 | $90 | $0 | $75 (DOESN'T COUNT SALE ROI) |
| CALCULATION OF ALL BUSINESSES IN SAME CLUSTER & SAME INDUSTRY | | | | | | | | |
| CALCULATION OF ALL BUSINESSES IN SAME CLUSTER | | | | | | | | |

FIG. 8B

CAMPAIGN TEMPLATE — 1302

| MARKETING PLATFORM | AD PLATFORM VARIABLE | VARIABLE RATIO SPEND | CALL CONVERSIONS | EMAIL CONVERSIONS | SALE CONVERSIONS | TOTAL CONVERSIONS | CALL ROI | EMAIL ROI | SALE ROI | TARGET AVG. ROI |
|---|---|---|---|---|---|---|---|---|---|---|
| GOOGLE SEARCH TEXT | GOOGLEA | 31% | +5 | +1 | 0 | +6 | $50 | $80 | $0 | $65 |
| GOOGLE SEARCH TEXT TO CALL | GOOGLED | 20% | -2 | 0 | 0 | -2 | $70 | $90 | $0 | $80 |
| ... | | | | | | | | | | |

CURRENT BUSINESS PERFORMANCE — 1304

| MARKETING PLATFORM | AD PLATFORM VARIABLE | VARIABLE RATIO SPEND | CALL CONVERSIONS | EMAIL CONVERSIONS | SALE CONVERSIONS | TOTAL CONVERSIONS | CALL ROI | EMAIL ROI | SALE ROI | TARGET AVG. ROI |
|---|---|---|---|---|---|---|---|---|---|---|
| GOOGLE SEARCH TEXT | GOOGLEA | 25% | 10 | 4 | 0 | 14 | $60 | $100 | $0 | $80 |
| GOOGLE SEARCH TEXT TO CALL | GOOGLED | 30% | 4 | 2 | 0 | 6 | $100 | $120 | $0 | $110 |
| ... | | | | | | | | | | |

FIG. 13

| PREDICTOR TEMPLATE METRIC | PREDICTOR CAMPAIGN TEMPLATE AGAINST CURRENT BUSINESS PERFORMANCE | BUSINESS ACTION |
|---|---|---|
| VARIABLE RATIO SPEND | HIGHER | INCREASE AD TYPE BUDGET TO SPECIFIED CAMPAIGN TEMPLATE RATIO |
|  | LOWER | DECREASE AD TYPE BUDGET TO SPECIFIED CAMPAIGN TEMPLATE RATIO |
| "CALL/EMAIL/SALE" ROI | HIGHER (NOT DESIRED) | NO CHANGE TO AD TYPE COPY |
|  | LOWER (DESIRED) | ADD NEW AD COPY SPLIT TEST |

| AD TYPE A | |
|---|---|
| AD TYPE | VARIABLE NAME |
| SALES > SEARCH > TEXT | ADTYPEA - A |
| SALES > SEARCH > SHOPPING | ADTYPEA - B |
| SALES > SMART > SHOPPING | ADTYPEA - C |
| LEADS > SEARCH > TEXT TO CALL | ADTYPEA - D |
| LEADS > SEARCH > TEXT | ADTYPEA - E |
| LEADS > SMART > CALL | ADTYPEA - F |

*1506-A*

| AD TYPE B | |
|---|---|
| AD TYPE | VARIABLE NAME |
| LEADS > IMAGE/DESC > LINK | ADTYPEB - A |
| LEADS > IMAGE/DESC > CALL | ADTYPEB - B |
| COLLECTING MORE... | ADTYPEB - C |
| | ADTYPEB - D |
| | ADTYPEB - E |
| | ADTYPEB - F |

SYSTEM AND METHOD FOR MULTI-CHANNEL DIGITAL MARKETING OPTIMIZATION

BACKGROUND OF THE INVENTION

Today, more than half the world population are active internet users. The associated growing e-commerce marketplace accounts for trillions of dollars in revenue in the United States alone. Thus, digital marketing is vital for a business's success and brand awareness.

Digital marketing includes all marketing efforts that use an electronic device or the internet. Businesses leverage digital channels such as search engines, social media, email, online advertising, and various website platforms to connect with current and prospective customers. Digital content and marketing is so prevalent that consumers now expect and rely on it as a way to learn about brands.

Because digital marketing has so many options, tactics, and strategies associated with it, businesses typically rely on the personal experience of marketing agencies to manage their marketing campaigns and budget allocation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 8A and 8B taken together is a table illustrating marketing optimization data in accordance with some embodiments.

FIG. 13 illustrates an example of a comparison model of various data for use within the marketing optimization program in accordance with some embodiments.

FIG. 14 illustrates an example table of rules for use within the marketing channel optimization program in accordance with some embodiments.

FIG. 16 illustrates a table of example advertisement type options for implementation by the marketing channel optimization program.

Figure 1:
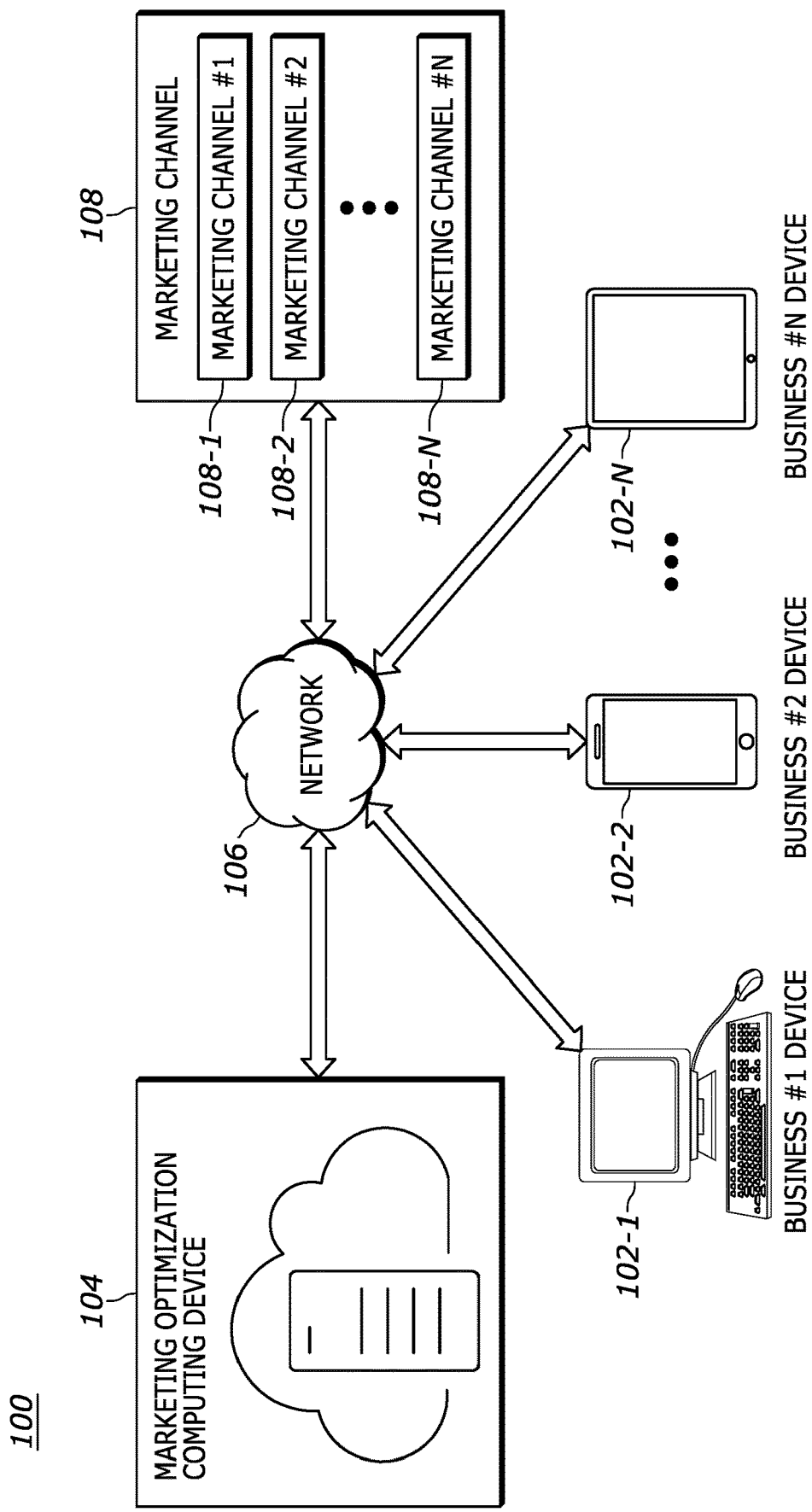
FIG. 1 is a block diagram of a marketing optimization system implemented in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A system for multi-channel digital marketing optimization includes a memory for storing a marketing optimization program code, and a marketing optimization data; and a processor communicatively coupled to the memory. The processor executes the marketing optimization program code to create a cluster template by creating and storing within the marketing optimization data an individual business template for each of a plurality of businesses, classifying the plurality of businesses into a cluster based at least in part on one or more marketing objectives, creating and storing within the marketing optimization data a cluster template based at least in part on a combination of captured and calculated data for the plurality of businesses within the cluster. The processor executes the marketing optimization program code further to repeat the cluster template creation steps for a plurality of clusters; and to mathematically combine the cluster templates to create a plurality of target marketing templates.

A method for multi-channel digital marketing optimization includes creating a cluster template by creating and storing within a marketing optimization data storage an individual business template for each of a plurality of businesses, classifying the plurality of businesses into a cluster based at least in part on one or more marketing objectives, and creating and storing within the marketing optimization data storage the cluster template based at least in part on a combination of captured and calculated data for the plurality of businesses within the cluster. The method further includes repeating the cluster template creation steps for a plurality of clusters; and mathematically combining the cluster templates to create a plurality of target marketing templates.

FIG. 1 is a block diagram of a marketing optimization system 100 implemented in accordance with some embodiments. As shown, the marketing optimization system 100 includes one or more business devices 102, at least one marketing optimization computing device 104, a network 106, and one or more marketing channels 108.

The marketing optimization computing device 104 may be communicatively coupled to, and receive information from, the one or more business devices 102, and the marketing channels 108. Communication between the marketing optimization computing device 104 and various components can occur through the network 106. In some embodiments, the network 106 is, for example, a wide area network (WAN) (e.g., a transport control protocol/internet protocol (TCP/IP) based network), a cellular network, or a local area network (LAN) employing any of a variety of communications protocols as is well known in the art.

The one or more marketing channels 108 may for example include, for example, Google Search Ads, Search Engine Optimization (SEO), Facebook/Instagram Ads, Google Merchant (Shopping) Ads, Google Video (YouTube) Ads, Yelp Ads, and any other digital marketing channel herein known or future developed.

Each of the one or more business devices 102 operates as a user interface for a corresponding business. Each corresponding business uses combinations of the various marketing channels 108 in pursuit of their business marketing objectives. For example, a business's marketing objectives may be to grow sales, acquire leads, increase visibility, and the like.

The type of business typically dictates the desired result of marketing efforts. The marketing objectives of a physical storefront with local services may include call leads and message leads. The marketing objectives of a physical storefront with product goods may include in-store sales, call leads, and message leads. The marketing objectives of a physical storefront with E-Commerce may include in-store sales, online sales, call leads, and message leads. The marketing objectives of a business with product goods on E-Commerce may include online sales and message leads. It will be appreciated by those of ordinary skill in the art that the marketing objectives of a given business are individualized and often fluctuating.

In operation, the marketing optimization computing device 104 optimizes market channel utilization/spend for each business based on business objectives received from an associated business device 102 and aggregated data from identified similar businesses. The marketing optimization computing device 104 operates to cluster "like" businesses based on lead objective ratios and optimize marketing spend accordingly. Further the marketing optimization computing device operates to optimize marketing channels for a new business against the aggregate cluster of other "like" businesses to meet objectives.

Figure 2:
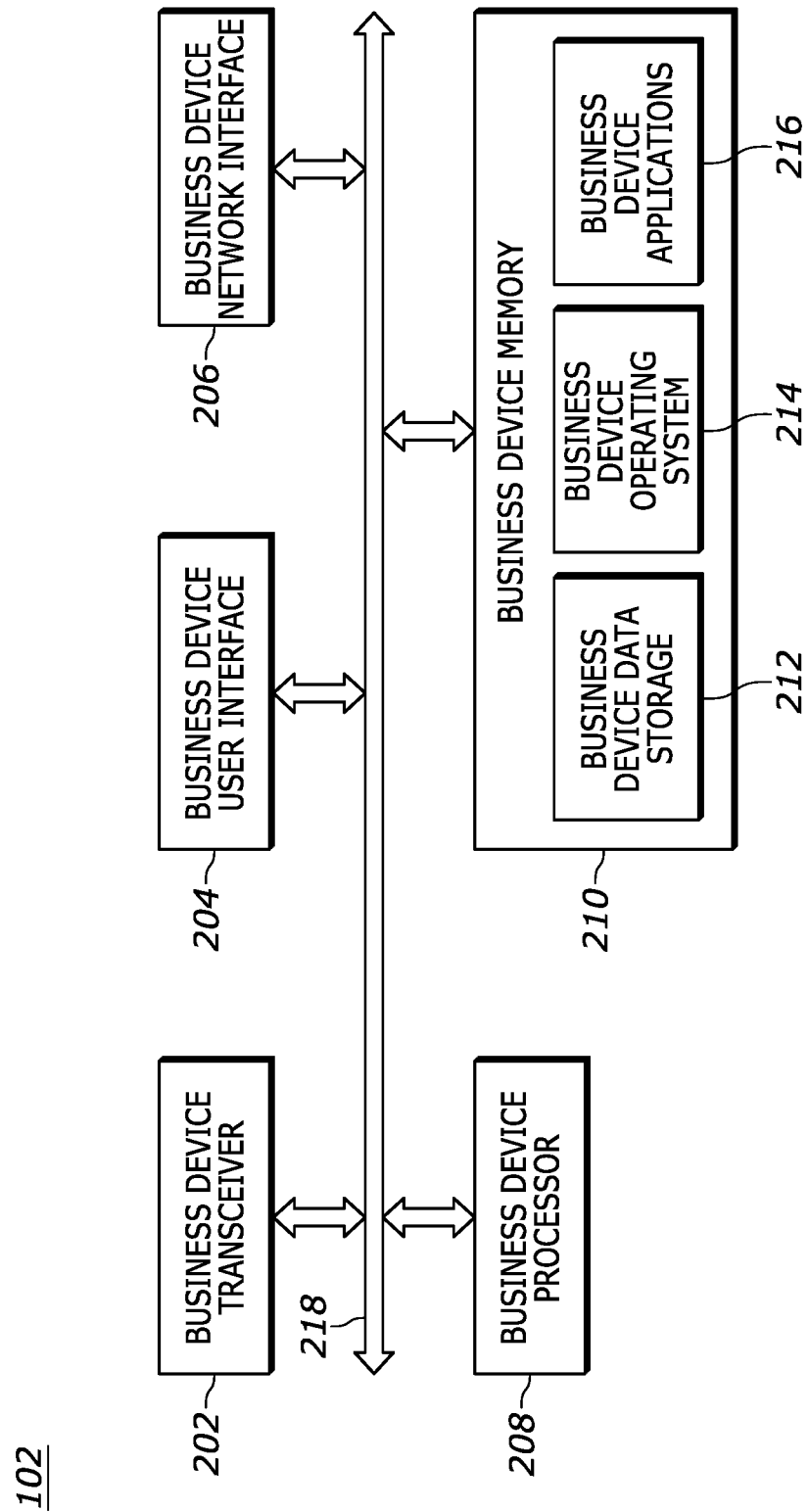
FIG. 2 is a block diagram of a business device for use within the marketing optimization system of FIG. 1 in accordance with some embodiments.

FIG. 2 is a block diagram of one exemplary embodiment of a business device 102 for use within the marketing optimization system 100 of FIG. 1. The business device 102 is electrically and/or communicatively connected to a variety of other devices and databases as previously described with respect to FIG. 1 herein. In some embodiments, the business device 102 includes a plurality of electrical and electronic components, providing power, operational control, communication, and the like within the business device 102. For example, the business device 102 includes, among other things, a business device transceiver 202, a business device user interface 204, a business device network interface 206, a business device processor 208, and a business device memory 210.

It should be appreciated by those of ordinary skill in the art that FIG. 2 depicts the business device 102 in a simplified manner and a practical embodiment may include additional components and suitably configured logic to support known or conventional operating features that are not described in detail herein. It will further be appreciated by those of ordinary skill in the art that the business device 102 may be a personal computer, desktop computer, tablet, smartphone, or any other computing device now known or in the future developed. It will further be appreciated by those of ordinary skill in the art that the business device 102 alternatively may function within a remote server, cloud computing device, or any other remote computing mechanism now known or in the future developed.

The components of the business device 102 (for example 202, 204, 206, 208 and 210) are communicatively coupled via a business device local interface 218. The business device local interface 218 may be, for example but not limited to, one or more buses or other wired or wireless connections, as is known in the art. The business device local interface 218 may have additional elements, which are omitted for simplicity, such as controllers, buffers (caches), drivers, repeaters, and receivers, among many others, to enable communications. Further, the business device local interface 218 may include address, control, and/or data connections to enable appropriate communications among the aforementioned components.

The business device processor 208 is a hardware device for executing software instructions. The business device processor 208 may be any custom made or commercially available processor, a central processing unit (CPU), an auxiliary processor among several processors associated with the business device processor 208, a semiconductor-based microprocessor, or generally any device for executing software instructions. When the business device 102 is in operation, the business device processor 208 is configured to execute software stored within the business device memory 210, to communicate data to and from the business device memory 210, and to generally control operations of the business device 102 pursuant to the software instructions.

The business device user interface 204 may be used to receive user input from and/or for providing system output to the user or to one or more devices or components. User input may be provided via, for example, a keyboard, touch pad, and/or a mouse. System output may be provided via a display device, speakers, and/or a printer (not shown). The business device user interface 204 may further include, for example, a serial port, a parallel port, an infrared (IR) interface, a universal serial bus (USB) interface and/or any other interface herein known or in the future developed.

The business device network interface 206 may be used to enable the business device 102 to communicate on a network, such as the network 106 of FIG. 1, a wireless access network (WAN), a radio frequency (RF) network, and the like. The business device network interface 206 may include, for example, an Ethernet card or adapter or a wireless local area network (WLAN) card or adapter. Additionally or alternatively the business device network interface 206 may include a radio frequency interface for wide area communications such as Long Term Evolution (LTE) networks, or any other network now known or in the future developed. The business device network interface 206 may include address, control, and/or data connections to enable appropriate communications on the network.

The business device memory 210 may include any of volatile memory elements (e.g., random access memory (RAM), nonvolatile memory elements (e.g., ROM), and combinations thereof. Moreover, the business device memory 210 may incorporate electronic, magnetic, optical, and/or other types of storage media. Note that the business device memory 210 may have a distributed architecture, where various components are situated remotely from one another, but can be accessed by the business device processor 208. The software in the business device memory 210 may include one or more software programs, each of which includes an ordered listing of executable instructions for implementing logical functions. The software in the business device memory 210 includes a suitable business device operating system 214 and one or more business device applications 216. The business device operating system 214 controls the execution of other computer programs, such as the one or more business device applications 216, and provides scheduling, input-output control, file and data management, memory management, and communication control and related services. The one or more business device applications 216 may be configured to implement the various processes, algorithms, methods, techniques, etc. described herein.

The business device memory 210 further includes a business device data storage 212 used to store data. In the exemplary embodiment of FIG. 2, the business device data storage 212 is located internal to the business device memory 210 of the business device 102. Additionally or alternatively, (not shown) the business device data storage 212 may be located external to the business device 102 such as, for example, an external hard drive connected to the business device user interface 204. In a further embodiment, (not shown) the business device data storage 212 may be located external and connected to the business device 102 through a network and accessed via the business device network interface 206.

In operation, initial information for storage in the business device data storage 212 is entered via the business device user interface 204. For example, an initial specified budget allocated to one or marketing platforms with an initial recommended ratio may be stored in the business device data storage 212. The content for initial advertisements is based on the business website and existing industry advertisement copies. The business 402 can create, revise, or refine the advertisement content as appropriate using the business device user interface 204 to store new information in the business device data storage.

The business device 102 in the exemplary example includes the business device transceiver 202. The business device transceiver 202 incorporating within a business device transceiver antenna (not shown), enables wireless communication from the business device 102 to, for example, the marketing optimization computing device 104 and the network 106, both of FIG. 1. It will be appreciated by those of ordinary skill in the art that the business device 102 may include a single business device transceiver as shown, or alternatively separate transmitting and receiving components, for example but not limited to, a transmitter, a transmitting antenna, a receiver, and a receiving antenna.

Figure 3:
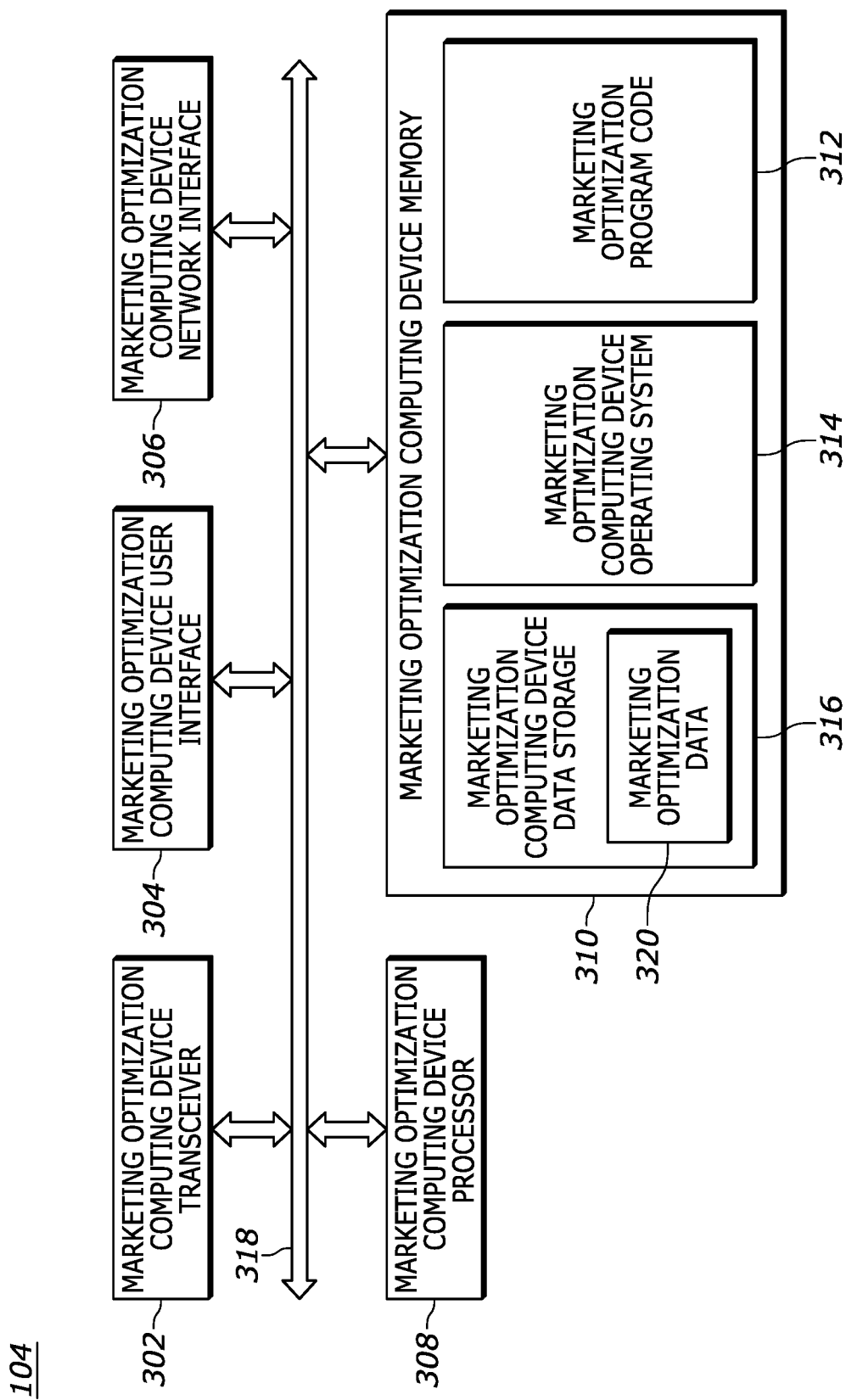
FIG. 3 is a block diagram of a marketing optimization computing device for use within the marketing optimization system of FIG. 1 in accordance with some embodiments.

FIG. 3 is a block diagram of one exemplary embodiment of a marketing optimization computing device 104 for use within the marketing optimization system 100 of FIG. 1. Specifically, the marketing optimization computing device 104 can implement the various methods described herein.

The marketing optimization computing device 104 is electrically and/or communicatively connected to a variety of other devices and databases as previously described with respect to FIG. 1 herein. In some embodiments, the marketing optimization computing device 104 includes a plurality of electrical and electronic components, providing power, operational control, communication, and the like within the marketing optimization computing device 104. For example, the marketing optimization computing device 104 includes, among other things, a marketing optimization computing device transceiver 302, a marketing optimization computing device user interface 304, a marketing optimization computing device network interface 306, a marketing optimization computing device processor 308, and a marketing optimization computing device memory 310.

It should be appreciated by those of ordinary skill in the art that FIG. 3 depicts the marketing optimization computing device 104 in a simplified manner and a practical embodiment may include additional components and suitably configured logic to support known or conventional operating features that are not described in detail herein. It will further be appreciated by those of ordinary skill in the art that the marketing optimization computing device 104 may be a personal computer, desktop computer, tablet, smartphone, or any other computing device now known or in the future developed.

It will further be appreciated by those of ordinary skill in the art that the marketing optimization computing device 104 alternatively may function within a remote server, cloud computing device, or any other remote computing mechanism now known or in the future developed. For example, the marketing optimization computing device 104 in some embodiments may be a cloud environment incorporating the operations of the marketing optimization computing device processor 308, the marketing optimization computing device memory 310, the marketing optimization computing device user interface 304, and various other operating modules to serve as a software as a service model for the business devices 102.

The components of the marketing optimization computing device 104 (for example 302, 304, 306, 308 and 310) are communicatively coupled via a marketing optimization computing device local interface 318. The marketing optimization computing device local interface 318 may be, for example but not limited to, one or more buses or other wired or wireless connections, as is known in the art. The marketing optimization computing device local interface 318 may have additional elements, which are omitted for simplicity, such as controllers, buffers (caches), drivers, repeaters, and receivers, among many others, to enable communications. Further, the marketing optimization computing device local interface 318 may include address, control, and/or data connections to enable appropriate communications among the aforementioned components.

The marketing optimization computing device processor 308 is a hardware device for executing software instructions. The marketing optimization computing device processor 308 may be any custom made or commercially available processor, a central processing unit (CPU), an auxiliary processor among several processors associated with the marketing optimization computing device processor 308, a semiconductor-based microprocessor, or generally any device for executing software instructions. When the marketing optimization computing device 104 is in operation, the marketing optimization computing device processor 308 is configured to execute software stored within the marketing optimization computing device memory 310, to communicate data to and from the marketing optimization computing device memory 310, and to generally control operations of the marketing optimization computing device 104 pursuant to the software instructions.

The marketing optimization computing device user interface 304 may be used to receive user input from and/or for providing system output to the user or to one or more devices or components. User input may be provided via, for example, a keyboard, touch pad, and/or a mouse. System output may be provided via a display device, speakers, and/or a printer (not shown). The marketing optimization computing device user interface 304 may further include, for example, a serial port, a parallel port, an infrared (IR) interface, a universal serial bus (USB) interface and/or any other interface herein known or in the future developed.

The marketing optimization computing device network interface 306 may be used to enable the marketing optimization computing device 104 to communicate on a network, such as the network 106 of FIG. 1, a wireless access network (WAN), a radio frequency (RF) network, and the like. The business device network interface 206 may include, for example, an Ethernet card or adapter or a wireless local area network (WLAN) card or adapter. Additionally or alternatively the business device network interface 206 may include a radio frequency interface for wide area communications such as Long Term Evolution (LTE) networks, or any other network now known or in the future developed. The marketing optimization computing device network interface 306 may include address, control, and/or data connections to enable appropriate communications on the network.

The marketing optimization computing device memory 310 may include any of volatile memory elements (e.g., random access memory (RAM), nonvolatile memory elements (e.g., ROM), and combinations thereof. Moreover, the marketing optimization computing device memory 310 may incorporate electronic, magnetic, optical, and/or other types of storage media. Note that the marketing optimization computing device memory 310 may have a distributed architecture, where various components are situated remotely from one another, but can be accessed by the marketing optimization computing device processor 308. The software in the marketing optimization computing device memory 310 may include one or more software programs, each of which includes an ordered listing of executable instructions for implementing logical functions. The software in the marketing optimization computing device memory 310 includes a suitable marketing optimization computing device operating system 314 and marketing optimization programming code 312. The marketing optimization computing device operating system 314 controls the execution of other computer programs, such as the marketing optimization program code 312, and provides scheduling, input-output control, file and data management, memory management, and communication control and related services. The marketing optimization program code 312 may be configured to implement the various processes, algorithms, methods, techniques, etc. described herein.

The marketing optimization computing device memory 310 further includes a marketing optimization computing device data storage 316 used to store data. In the exemplary embodiment of FIG. 3, the marketing optimization computing device data storage 316 is located internal to the marketing optimization computing device memory 310 of the marketing optimization computing device 104. Additionally or alternatively, (not shown) the marketing optimization computing device data storage 316 may be located external to the marketing optimization computing device 104 such as, for example, an external hard drive connected to the marketing optimization computing device user interface 304. In a further embodiment, (not shown) the marketing optimization computing device data storage 316 may be located external and connected to the marketing optimization computing device 104 through a network and accessed via the marketing optimization computing device network interface 306.

The marketing optimization computing device data storage 316, in accordance to some embodiments stores marketing optimization data 320 for operational use in the various processes, algorithms, methods, techniques, etc. described herein.

The marketing optimization computing device 104 in the exemplary example includes the marketing optimization computing device transceiver 302. The marketing optimization computing device transceiver 302 incorporating within a marketing optimization computing device transceiver antenna (not shown), enables wireless communication from the marketing optimization computing device 104 to, for example, one or more business devices 102 and the network 106, both of FIG. 1. It will be appreciated by those of ordinary skill in the art that the marketing optimization computing device 104 may include a single marketing optimization computing device transceiver as shown, or alternatively separate transmitting and receiving components, for example but not limited to, a transmitter, a transmitting antenna, a receiver, and a receiving antenna.

Figure 4:
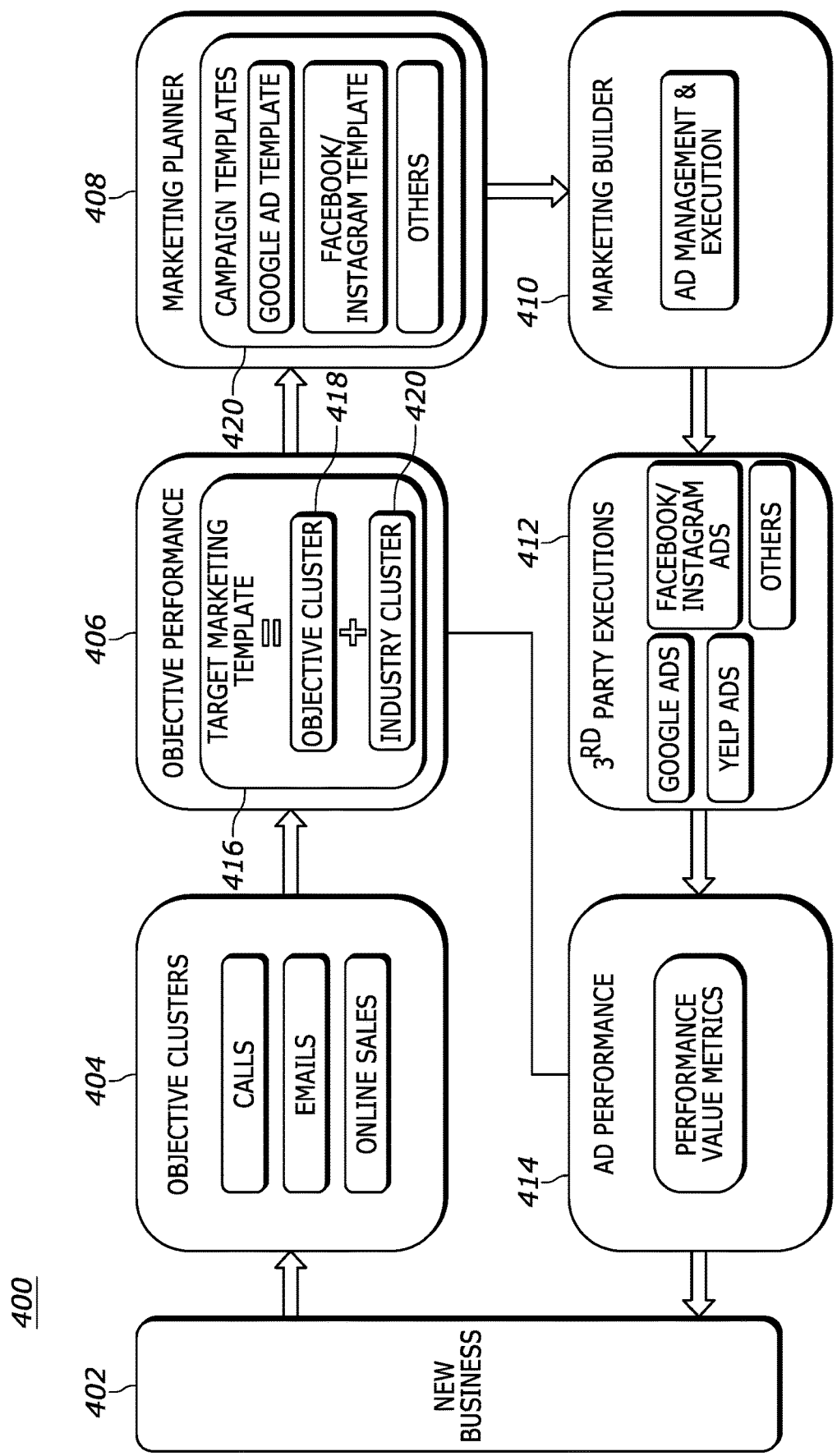
FIG. 4 is a functional block diagram illustrating the interactions of the various components of a marketing channel optimization program in accordance with some embodiments.

FIG. 4 is a flow diagram of the interactions of the various components of a marketing channel optimization program 400 in accordance with some embodiments. The marketing channel optimization program 400, for example, may be implemented within the marketing optimization program code 312 of FIG. 3. In an alternative embodiment, the marketing optimization program 400 may be implemented as a cloud-based internet program accessed via the business devices 102 and the marketing optimization computing device 104. In yet another alternative embodiment, the marketing optimization program 400 can be distributively implemented within a system in which the various components are remotely located from each other in other embodiments. For example, a first set of components of the marketing channel optimization program may be implemented and stored within the marketing optimization computing device 104, a second set of components of the marketing channel optimization program may be implemented and stored within one or more of the business devices 102, and a third set of components of the marketing channel optimization program may be implemented and stored within other devices connected to the network 106 or otherwise communicatively coupled to the marketing optimization computing device 104 and the business devices 102. It will be appreciated that any and all distribution arrangements of the marketing channel optimization program are within the scope of the claimed invention herein.

In operation, the marketing optimization computing device processor 308 accesses and executes the marketing channel optimization program 400.

As illustrated, the marketing channel optimization program 400 includes at least an objective clusters module 404, an objective performance module 406, a marketing planner module 408, a marketing builder module 410, a third party executions module 412, and an ad performance module 414. Each module is communicatively coupled to one or more other modules for the sharing of information and data. It will be appreciated by those of ordinary skill in the art that the flow diagram of FIG. 4 is simply an exemplary embodiment and other alternative communication flows between the modules are within the scope of the claimed invention herein.

In operation, a business 402 interacts with the marketing optimization program 400 through the network 106 via its business device 102. For example, the business device receives user input at its business device user interface 204, stores the information within the user input in the business device data storage 212, and accesses the marketing optimization program 400 by the business device processor 208 executing one or more of the business device applications 216.

Information originally entered by the business 402 may include, for example, business and objective level details. The business 402 may also provide authorizations to integrate existing marketing channel platforms and/or create new ones.

Initially, the business 402, via its business device 102, enters into an account dashboard a set of objectives, total marketing budget specified, marketing platforms integrated and website integrated (e.g. authorize wordpress admin login, etc.). It will be appreciated by those of ordinary skill in the art that although the operation of FIG. 4 will be described for a single business, alternatively, one account can manage multiple businesses.

Figure 5:
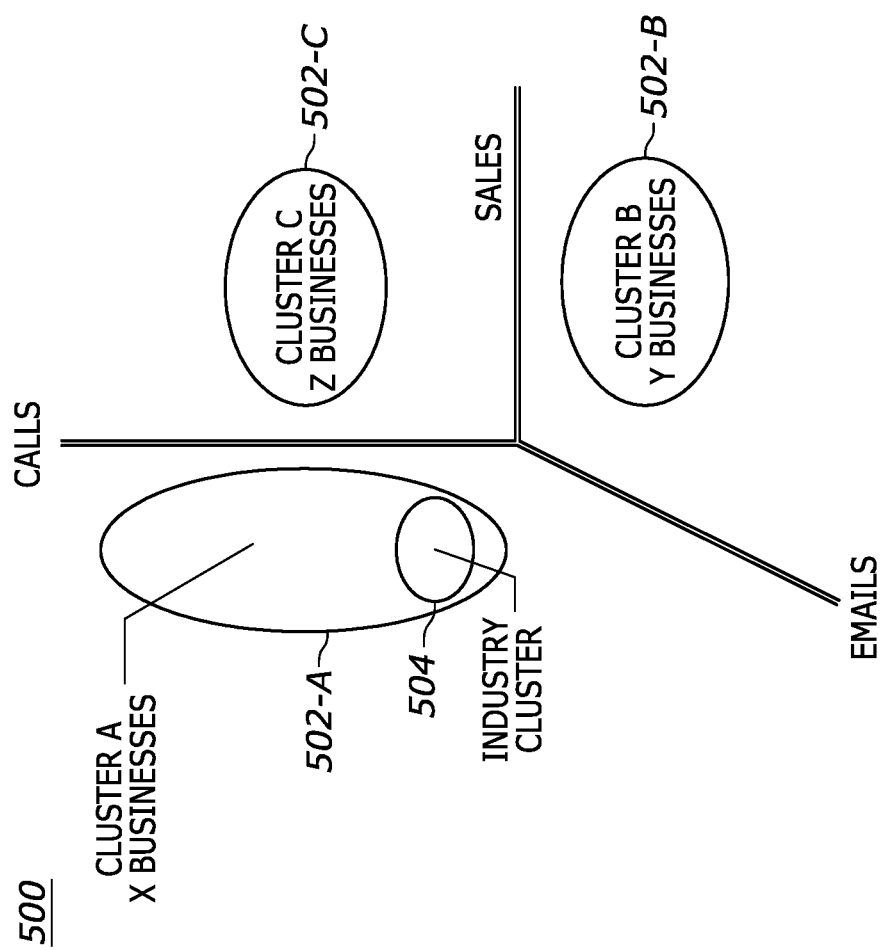
FIG. 5 illustrates an objective clusters graph in accordance with some embodiments.

The objective clusters module 404 classifies businesses into clusters 502 based on desired marketing objectives. As illustrated in an objective clusters graph 500 of FIG. 5, a business 402 is classified into clusters of other "like" businesses based on desired marketing objectives specified as part of business profile. Further, minor industry clusters 504, within a cluster 502, captures industry trending as a component of performance, in some embodiments.

It will be appreciated by those of ordinary skill in the art that marketing strategy and budgeting is heavily driven by the outcomes desired. By classifying businesses in this respect marketing programs can be optimized towards the desired result. In general operation, the classifications determine recommended goals for email submit, calls and sales for the business 402 based on its business and objectives.

For example, when a local business solely wants phone call leads then marketing channels may shift more towards Google Ads with phone extension and Google Business Ad with direct calls over straight Google text ads.

Figure 6:
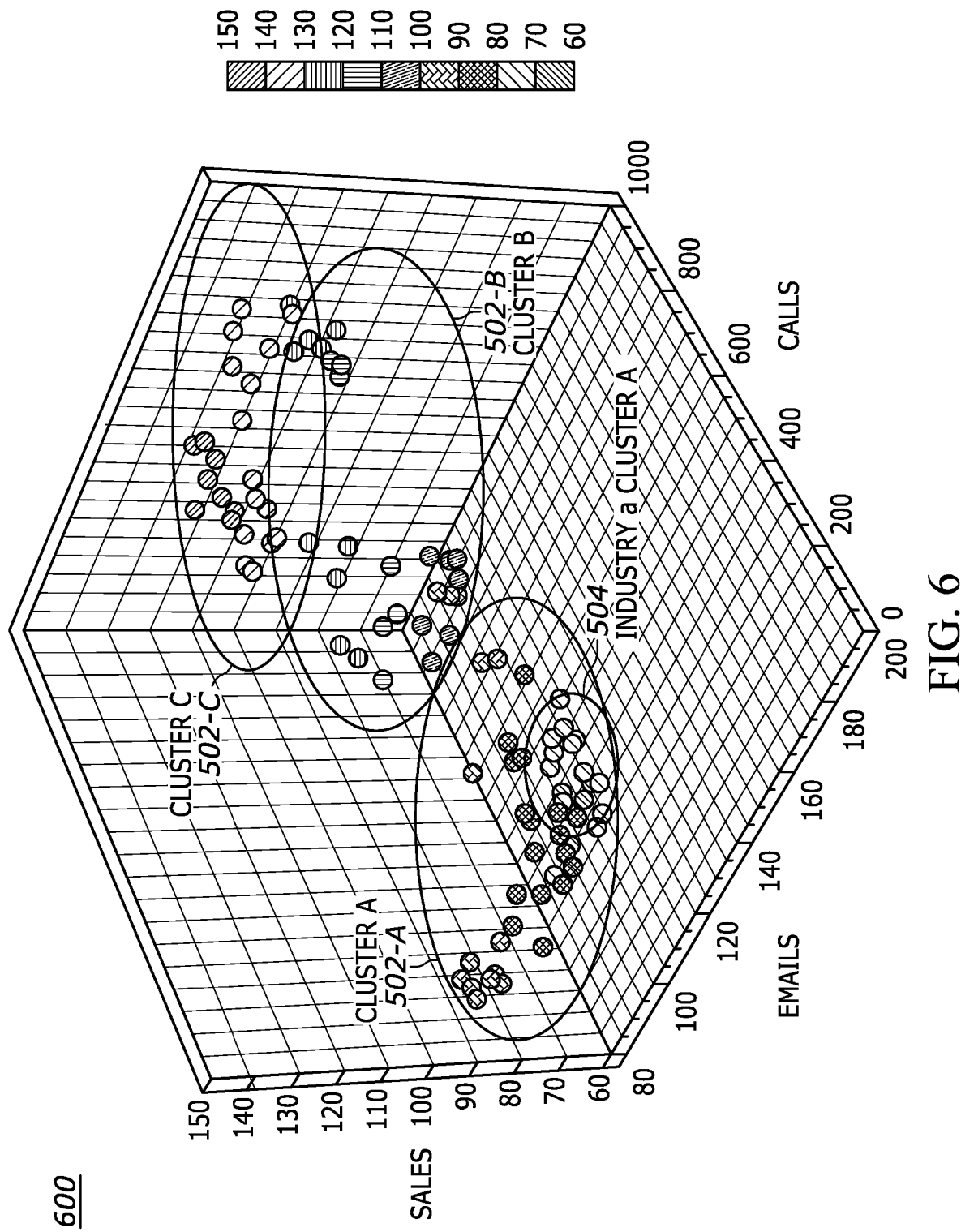
FIG. 6 illustrates a three-dimensional graphical representation of objective clusters in accordance with some embodiments.

In operation, as illustrated in a three dimensional graphical representation 600 of FIG. 6, the objective clusters module 404 continuously classifies a business 402 based on objectives. In FIG. 6, the objectives of sales, emails, and calls for the clusters 502 and industry cluster 504 are illustrated. It will be appreciated by those of ordinary skill in the art that these are solely for illustrative purposes, and that the objective clusters may include any other business objective as well (i.e.: brand recognition).

Specifically, the objective clusters module 404 implements a machine learning classifier algorithm. In accordance with some embodiments of the invention, the machine learning classifier algorithm may utilize any machine learning methodology, now known or in the future developed, for classification. For example, the machine learning methodology utilized may be one or a combination of: Linear Classifiers (Logistic Regression, Naive Bayes Classifier); Nearest Neighbor; Support Vector Machines; Decision Trees; Boosted Trees; Random Forest; and/or Neural Networks.

The machine learning classifier algorithm continually evolves classification in real time with new business additions. The classification intent is to continually "group" like businesses to implement optimized marketing campaigns as trends change overtime.

Figure 7:
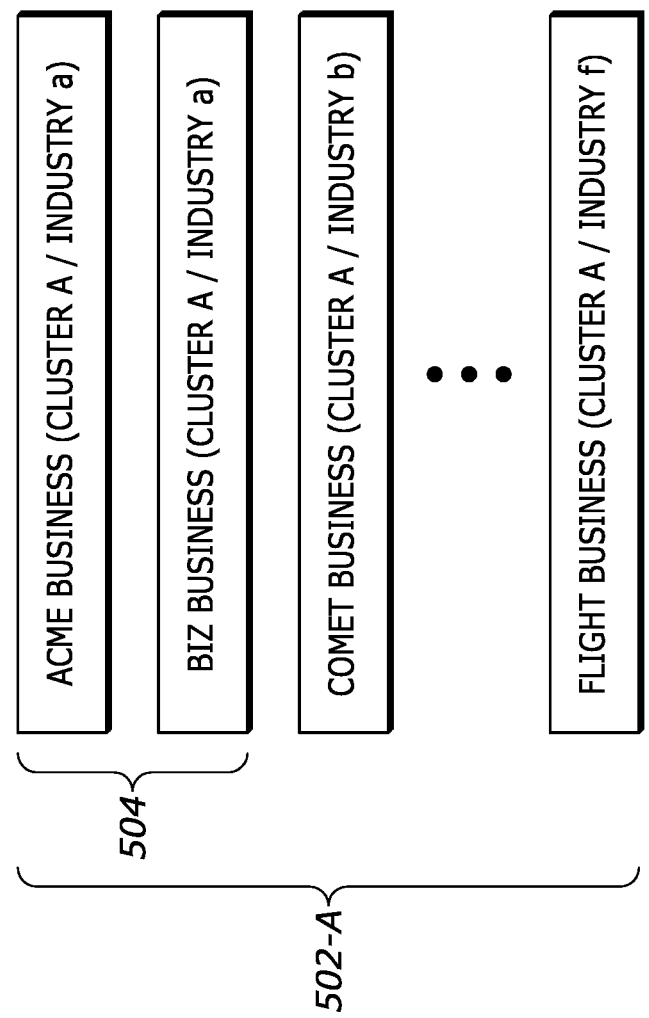
FIG. 7 illustrates an example of further detail of objective clusters in accordance with some embodiments.

FIG. 7 illustrates an example of a plurality of businesses 402 within one cluster 502-A and separately further grouped within a plurality of industries of cluster A 504. It will be appreciated by those of ordinary skill in the art that the quantity of cluster and industry combinations grows exponentially as the number of participating businesses increases.

Returning to FIG. 4, the objective performance module 406 manages a plurality of templates 416. The templates organize marketing performance metrics to further optimize an overall marketing campaign. In some embodiments, there are three layers of templates including Individual Business Level templates (not shown in FIG. 4), Industry Level templates 420, and Objective Cluster Level templates 418.

Turning now to FIGS. 8A and 8B, a table for storage of a plurality of market optimization data 320 in accordance with some embodiments is illustrated. As previously illustrated in FIG. 3, the market optimization data 320 in an exemplary embodiment is stored within the marketing optimization computing device data storage 316 of the marketing optimization computing device 104. In the example of FIGS. 8A and 8B, the market optimization data 320 includes the industry 504, the cluster 502, the marketing channel 108, a marketing channel variable 806, (illustrated in FIG. 8A) and a plurality of stored data 804 (illustrated in FIG. 8B) for each of an individual business level template, the objective cluster level template 418, and the industry level template 420. It will be appreciated by those of ordinary skill in the art that the market optimization data 320 is illustrated for simplicity purposes as one of each category template. In other embodiments, more than one of each template may be included within the market optimization data 320.

The plurality of stored data 804 includes both captured and calculated data for each of the plurality of templates 416. For example, for each template 416, a variable ratio spend, a call conversions number, an email conversions number, a sale conversion number may be captured and stored. Furthermore, for each template 416, a total conversions number, a call return on investment (ROI), an email return on investment (ROI), a sale return on investment (ROI) and a total average return on investment (ROI) may be calculated and stored.

In accordance with some embodiments, each of the plurality of stored data 804 for the industry level template 420 comprises a combination of captured and calculated data for all businesses in the same cluster 502 and industry 504. Similarly, in accordance with some embodiments, each of the plurality of stored data 804 for the objective cluster level template 418 comprises a combination of captured and calculated data for all businesses in the same cluster.

Figure 9:
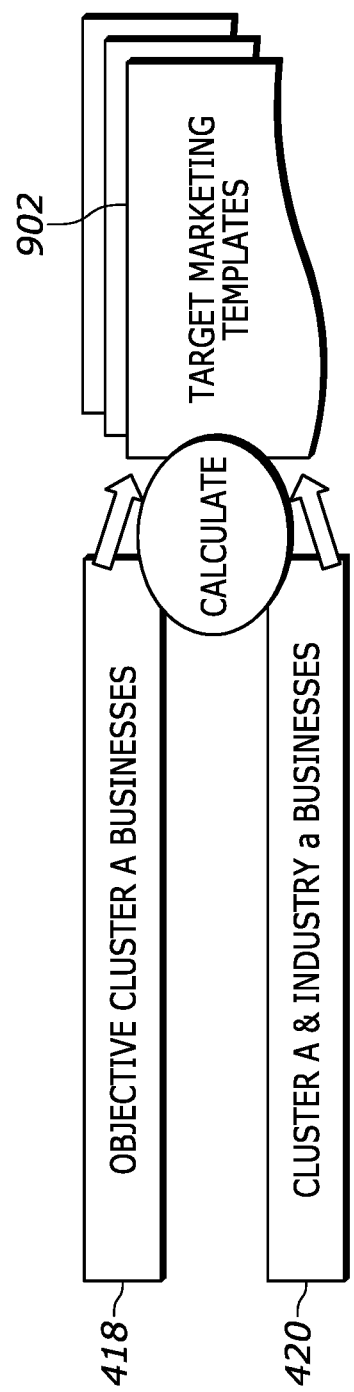
FIG. 9 illustrates further detail of the marketing channel optimization program in accordance with some embodiments.

As illustrated in FIG. 9, each of an objective cluster level template 418 and one or more industry level templates 420 are mathematically combined to create a plurality of target marketing templates 902 using one or more calculation methods now known or future developed. For example, the calculation method may be a mathematical averaging. Specifically, in accordance with some embodiments, each of the plurality of target marketing templates 902 comprises cluster calculated combinations of each marketing channel within the cluster.

Figure 10:
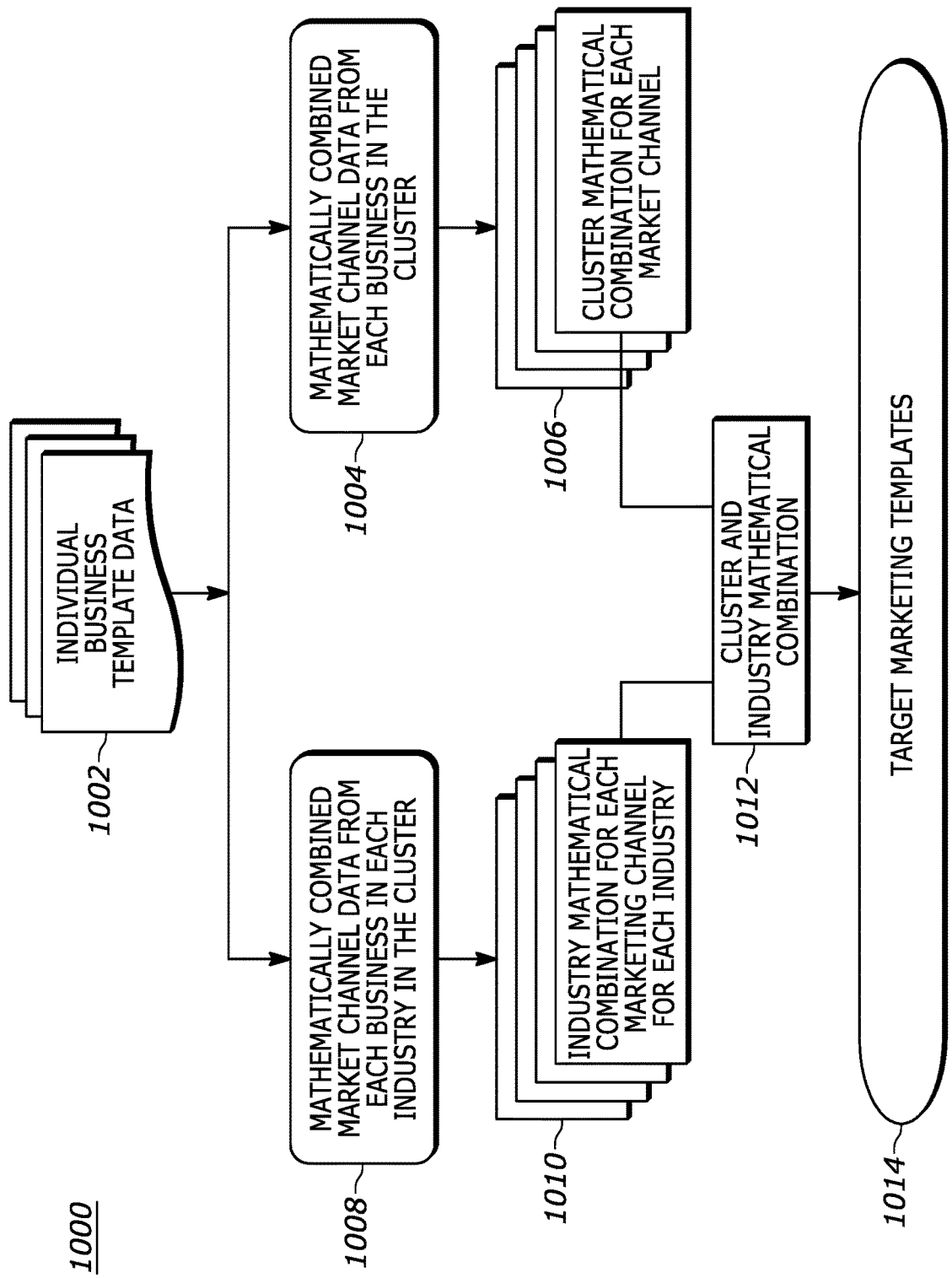
FIG. 10 is a flowchart illustrating an example method of operation of the marketing channel optimization program in accordance with some embodiments.

FIG. 10 is a flowchart illustrating operation of the marketing channel optimization program 400 in accordance with some embodiments. As described previously herein, the marketing optimization computing device processor 308 accesses and executes the marketing channel optimization program 400 including the method 1000 of FIG. 10.

Specifically, FIG. 10 illustrates a method 1000 for creating a plurality of target marketing templates 1014 in accordance with some embodiments. For simplicity purposes, the method 1000 illustrates the operation for one cluster 502; and groups various individual similar operations together. It will be appreciated by those of ordinary skill in the art that in operation, the marketing channel optimization program 400, and specifically the objective performance module 406, in some embodiments, repeats the method 1000 for a plurality of clusters 502. Further, it will be appreciated that the calculations detailed in FIG. 10 in accordance with some embodiments, are individual and distinct operations for each marketing channel, each industry, and each cluster.

Beginning with Operation 1002, as described previously herein, an individual business template 802 is stored within the marketing optimization data 320 block on an ongoing basis for each of a plurality of individual businesses 402. It will be appreciated that each of the plurality of businesses 402 within the cluster 502 will have one individual business template 802 per cluster. Next, in Operation 1004, the objective performance module 406 mathematically combines all market channel data from all businesses within the cluster for an individual market channel. This calculation is repeated for each marketing channel within the cluster. In Operation 1006, the cluster mathematical combination for each market channel is stored.

Similarly, in Operation 1008, the objective performance module 406 mathematically combines all market channel data from all businesses within a given industry cluster 504 within the cluster 502 for an individual market channel. This calculation is repeated for each marketing channel within the industry cluster within the cluster. In Operation 1010, the industry cluster mathematical combination for each market channel is stored. It will be appreciated that there may be a plurality of industry clusters within each given cluster. Step 1008 and Operation 1010 will be repeated for each such industry cluster.

In Operation 1012, for each marketing channel, the mathematically combined cluster calculation and the mathematical combination of all industry clusters calculations are further mathematically combined. The output of Operation 1012, in other words the mathematical combinations of each marketing channel type within the cluster form to create the target marketing templates of Operation 104. For example, in a hypothetical situation in which there are three objective clusters and ten industries, a total of ninety (90) target marketing templates would be created daily based on performance. These are run independent of any one business.

Referring to FIG. 4, the output of the objective performance module 406 is utilized next by a marketing planner module 408. The marketing planner module 408 continuously analyzes the marketing performance templates and creates campaign templates 420.

Figure 11:
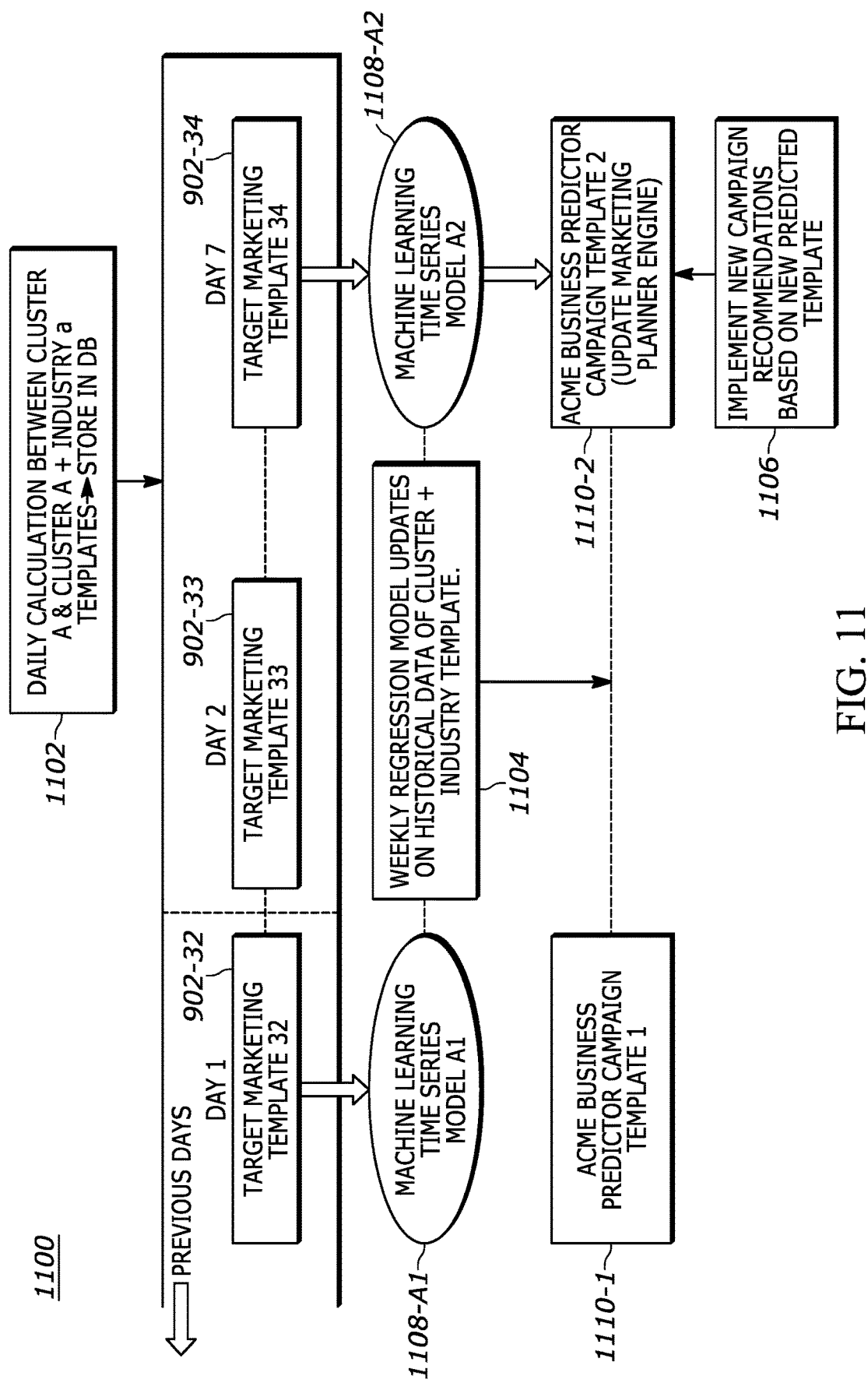
FIG. 11 illustrates an example operation of the marketing channel optimization program in accordance with some embodiments.

FIG. 11 illustrates an exemplary embodiment of the operation of the marketing planner module 408. Specifically, FIG. 11 illustrates the operation of the marketing planner module 408 during a seven day period of time for a cluster 502. As illustrated in FIG. 11, Operation 1102, on a daily basis, the mathematical combination between the cluster 502 templates and the industries 504 of the cluster 502 are recalculated to create each target marketing template 902, as previously described in FIGS. 9 and 10. The daily calculations are stored thereafter, for example, in the market optimization computing device data storage 316. Next, in Operation 1104, using one or more machine learning techniques 1108, weekly regression model updates are calculated on the historical data of the cluster templates and the industry templates. It will be appreciated by those of ordinary skill in the art, that as mentioned previously herein, any machine learning prediction modeling technique now known or in the future developed may be used within the scope of the invention. Thereafter, in Operation 1106, new campaign recommendations are implemented based on a new predictor campaign template 1110 for each individual business. It will be appreciated by those of ordinary skill in the art that the scenario of FIG. 11 is presented as a seven (7) day period of time for one business in one cluster for simplicity only; and that other embodiments include various time periods and a plurality of businesses, industries, and clusters.

Figure 12:
FIG. 12 illustrates a predictor campaign template in accordance with some embodiments.

FIG. 12 illustrates one embodiment of the predictor campaign template 1110. A predictor campaign template 1110 is essentially the guideline for the next marketing program iteration for a business 402. Predictor campaign templates 1110 are used to update the "running" campaign based on previous campaign performance. As previously described, each predictor campaign template 1120 is devised from the objective cluster and industry objective cluster performance data. In other words, digital marketing campaign optimization is based on cluster performance and not based on historical performance of solely the specific business. As illustrated in FIG. 12, a new spend ratio 1112 for the next marketing campaign adjustment is stored in the predictor campaign template. Furthermore, delta changes 1114 for each marketing channel conversion are predictions for the next ratio spend adjustment.

FIG. 13 illustrates an example of a comparison model of various data for use within the marketing optimization program in accordance with some embodiments. Specifically, FIG. 13 illustrates an example of a campaign template 1302 versus a current business performance data 1304 for a business. In operation, the most recent campaign template is used to update the current marketing campaigns. First, in this example, upon evaluating the variable ratio associated with the Google Search Text marketing platform of the current business model, using machine learning techniques, the marketing planner 408 determines the business should increase the spend ratio to thirty one percent (31%) if current performance is not there already. In this case a six percent (6%) increase. Next, in this example, upon evaluating the variable ratio associated with the google search text to call marketing platform of the current business model, using machine learning techniques, the marketing planner 408 determines the business should decrease the spend ratio to twenty percent (20%) if current performance is not there already. In this case a ten percent (10%) decrease. Lastly, in this example, upon evaluating the call ROI associated with the Google Search Text marketing platform of the current business model, using machine learning techniques, the marketing planner 408 determines the Call ROI is $50 for this marketing platform type. Since the business performance is less than the campaign template, an additional split test of ad copy is needed. The business recommendation is to maintain higher ROI and split test ad copy.

FIG. 14 provides further clarification of the method described previously herein for FIG. 13. Specifically, FIG. 14 illustrates a sample of rules used by the marketing planner to provide recommendations for an ad builder to take. The rules include recommended business actions based on the predictor template metrics and the comparison of the predictor campaign template and current business performance.

Referring back to FIG. 4, the output of the market planner module 408 is provided to the marketing builder module 410. The marketing builder module 410 operates to provide ad management and execution to each of the participating businesses.

Figure 15:
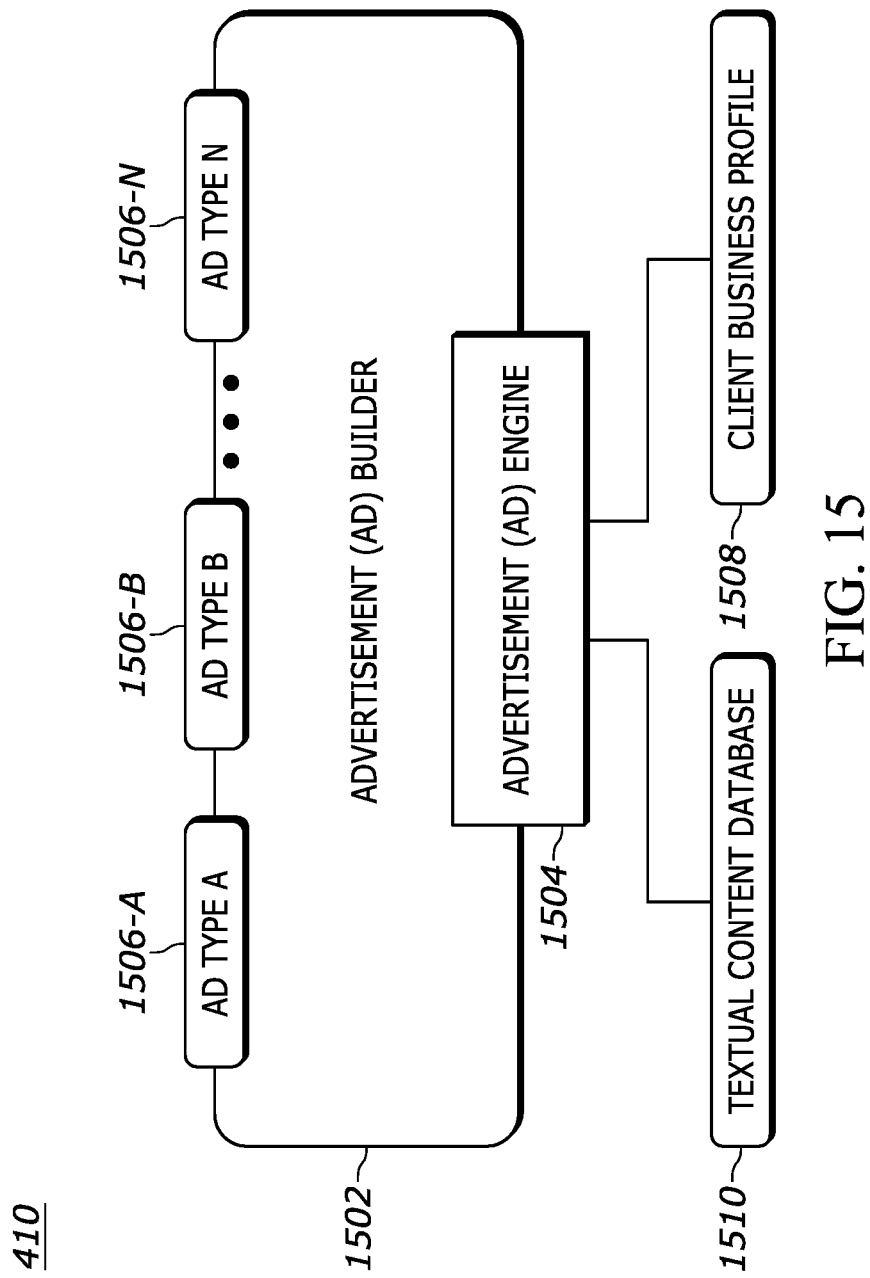
FIG. 15 is a block diagram of a marketing builder module in accordance with some embodiments.

FIG. 15 is a block diagram of a marketing builder module 410 in accordance with some embodiments. The marketing builder module 410 comprises an advertisement builder 1502 which utilizes an advertisement engine 1504. In operation, the advertisement engine 1504 automatically creates advertisement copy for one or more advertisement types 1506. The advertisement types 1506, for example, may be google advertisement types, social media advertisement types (Facebook, Instagram, LinkedIn, Yelp, and the like), website advertisement types, and/or any other advertisement type now known or in the future developed.

The advertisement engine 1504 includes operational modules that adhere to building the different advertisement types 1506 from third parties. For example, referring back to FIG. 4, the advertisement engine provides input to a third party executions module 412 for execution by one or more third parties of the advertisement content.

FIG. 16 illustrates a table 1600 of example advertisement type options for use in advertisement campaigns by the marketing builder module 410. In operation, the marketing builder module 410 provides recommendations to the third party executions module 412 for implementation. As illustrated, one or more created marketing campaigns may comprise a plurality of ad types each identified by an ad type variable name.

Returning to FIG. 15, the advertisement engine 1504 formulates advertisements based on inputs provided by a client business profile 1508 and a textual content database 1510.

The client business profile 1508 may include information entered by the business 402 and stored in the business device data storage 212 of the business device 102. The client business profile 1508, for example, may include a business name, a business description, one or more business services provided, a business telephone number, a business location, and/or any other business information for use in one or more advertisements.

The textual content database 1510 comprises a general repository for advertising words and phrases to be utilized for advertisement content. The textual content database 1510, may include, for example, common words or short phrases used in typical advertisements, synonyms of the common words or short phrases, negative keyword lists by industry level, data entered by the administrator of the software. It will be appreciated by those of ordinary skill in the art that in some embodiments the textual content database 1510 utilizes data associated with a cluster 512 or industry 504.

In one embodiment, the advertisement engine 1504 formulates two advertisements versions for each type of ad type 1506 to split test the marketing performance.

Referring back to FIG. 4, an ad performance module 414 incorporates performance value metrics to analyse the performance of the various advertisement types 1506. The ad performance module 414 output forms the input to the cyclical and continuous refinement nature of the marketing channel optimization program 400. Using analytics, the ad performance module 414 predicts performance at the individual advertisement platform level and at the aggregated advertisement platform business level for upcoming months. Performance may include, for example, advertisement spend, advertisement performance, and advertisement conversions.

In some embodiments a website analytics program such as Google Analytics may be integrated into a website of the business 402. The ad performance module 414 thereafter can track performance using the website analytics program.

Figure 17:
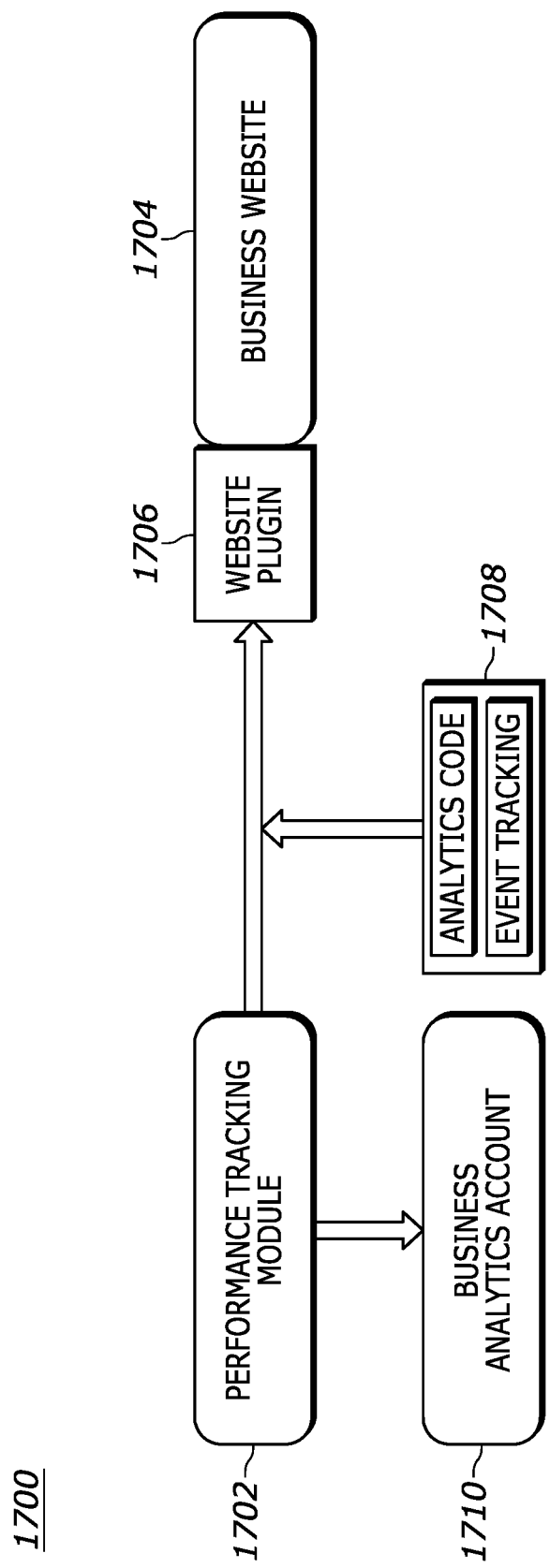
FIG. 17 is a block diagram illustrating a web integration system in accordance with some embodiments.

FIG. 17 is a block diagram illustrating a web integration system 1700 of the multi-channel digital marketing optimization for an exemplary business. Specifically, the web integration system 1700 includes a performance tracking module 1702 operating to automatically track conversions on a business website 1704 for a business 402. The web integration system 1700 provides full transparency to business to track all event types.

It will be appreciated by those of ordinary skill in the art that the performance tracking module 1702 in some embodiments is communicatively coupled to the business website 1704 through a website plugin 1706. In alternative embodiments, the performance tracking module 1702 is communicatively coupled directly to the business website. 1704.

In operation, the performance tracking module 1702 uses a plurality of program code 1708 to analyze the performance of the conversions of the business website and provides the performance information to a business analytics account 1710. For example the program code 1708 may include analytics code and event tracking code. The program code 1708, for example, may create goals for events based on a category, action, label, or value. The program code 1708 may track calls, email submissions, website sales, and the like, to determine conversion rates.

Figure 18:
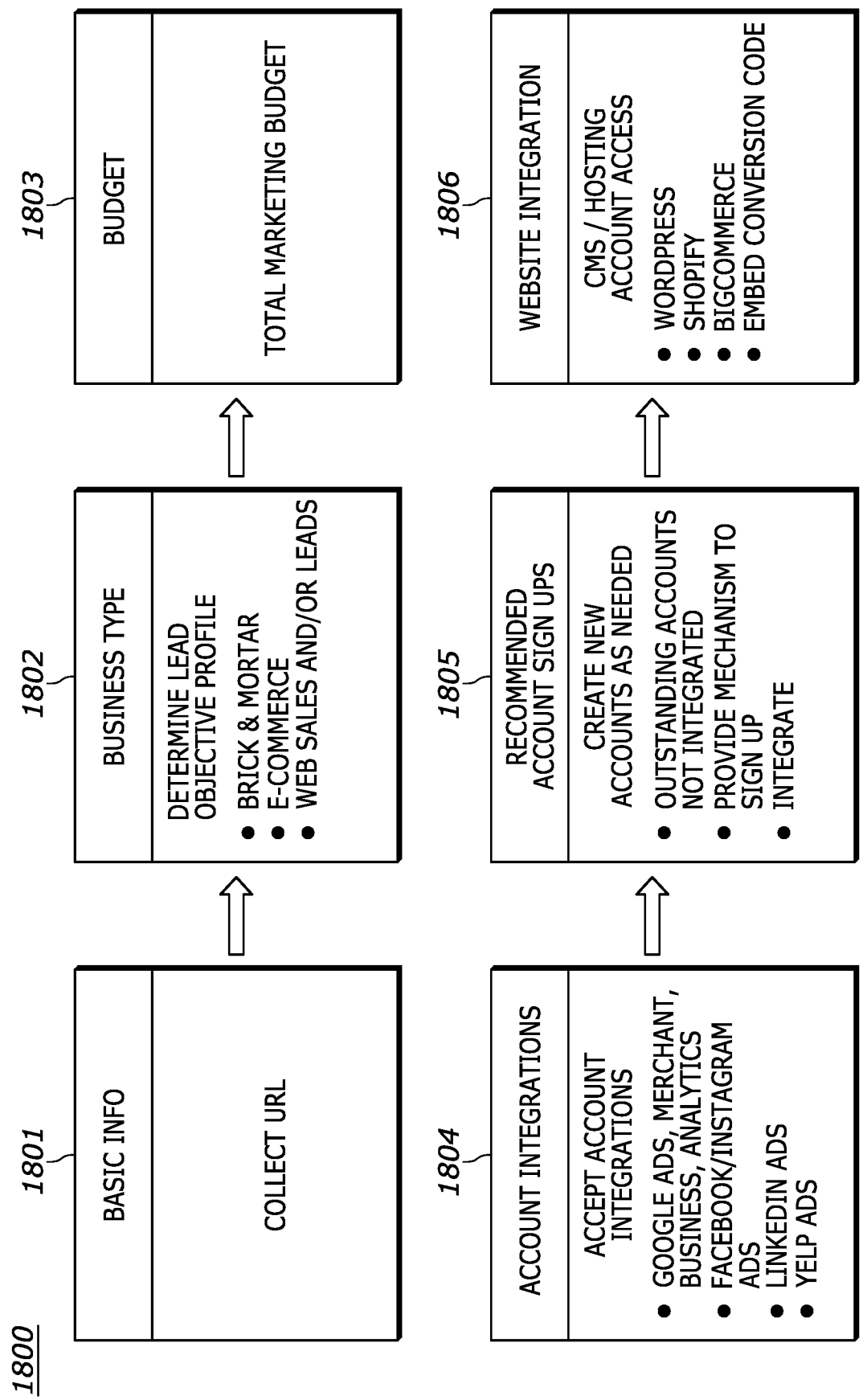
FIG. 18 illustrates a sample flow diagram of a business sign-up in accordance with some embodiments.

FIG. 18 illustrates a sample flow diagram of a new business 402 sign up within the marketing channel optimization program 400. As illustrated, in operation 1801, the marketing channel optimization program 400 collects basic information including the Uniform Resource Locator (URL), also known as the website address. Next, in operation 1802, the marketing channel optimization program 400 determines the business type associated with the lead objective profile. Next, in operation 1803, the marketing channel optimization program 400 identifies the total marketing budget. It will be appreciated that operations 1801 through 1803, in some embodiments are provided to the marketing channel optimization program by the business device 102 to the marketing optimization computing device 104 through the network 106.

Next, in operation 1804, the marketing channel optimization program determines account integrations of the business. In operation 1805, the marketing channel optimization program recommends new account integrations for the business. Thereafter, in Step 1806, the marketing channel optimization program completes website integration.

FIGS. 19 through 28 illustrate sample user interface layouts of the marketing channel optimization program 400. It will be appreciated by those of ordinary skill in the art that FIGS. 19 through 28 are provided for exemplary purposes only; and that any appropriate user interface is within the scope of this invention.

Figure 19:
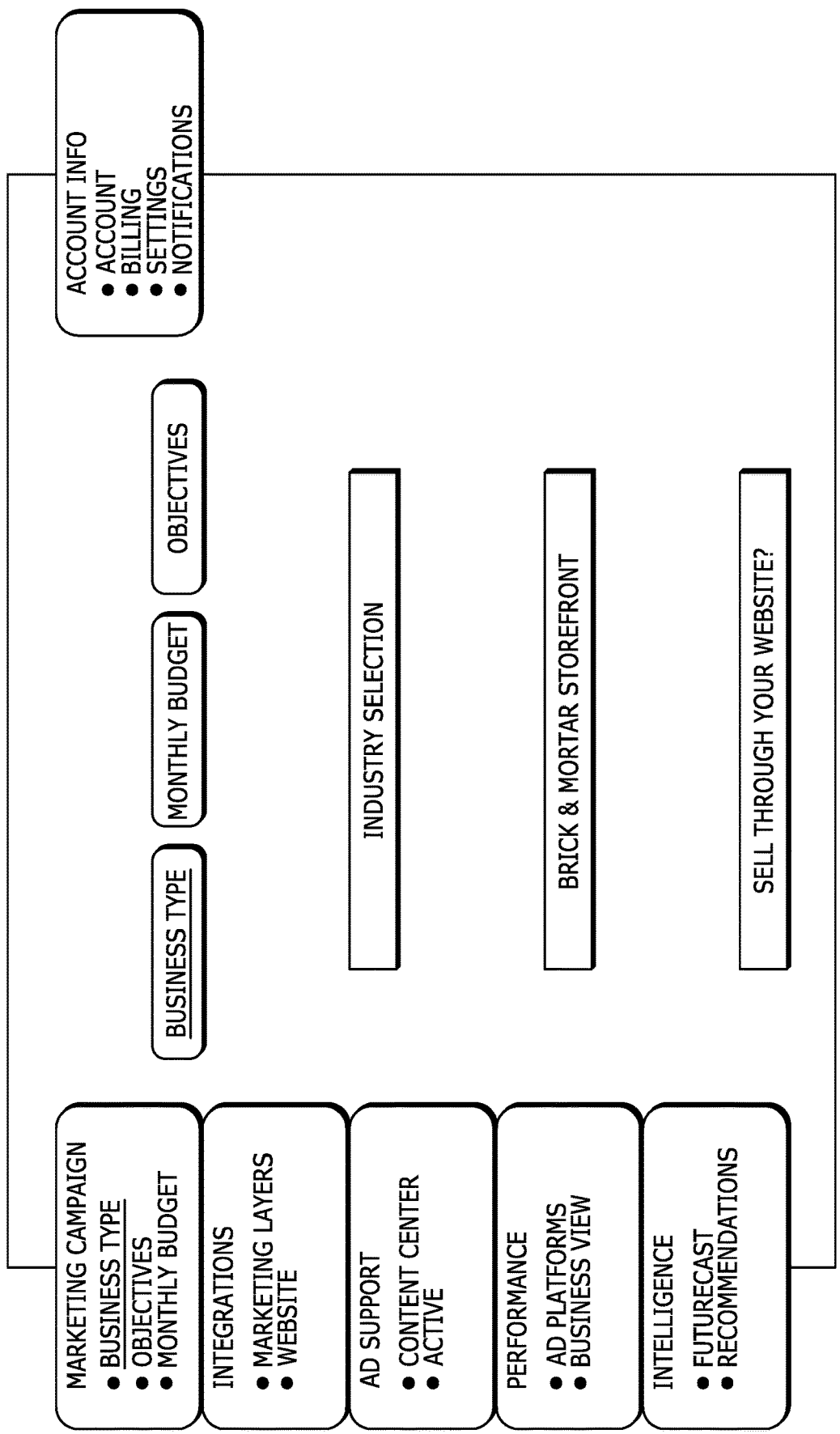
FIGS. 19 through 28 illustrate sample user interface layouts in accordance with some embodiments.
Figure 20:
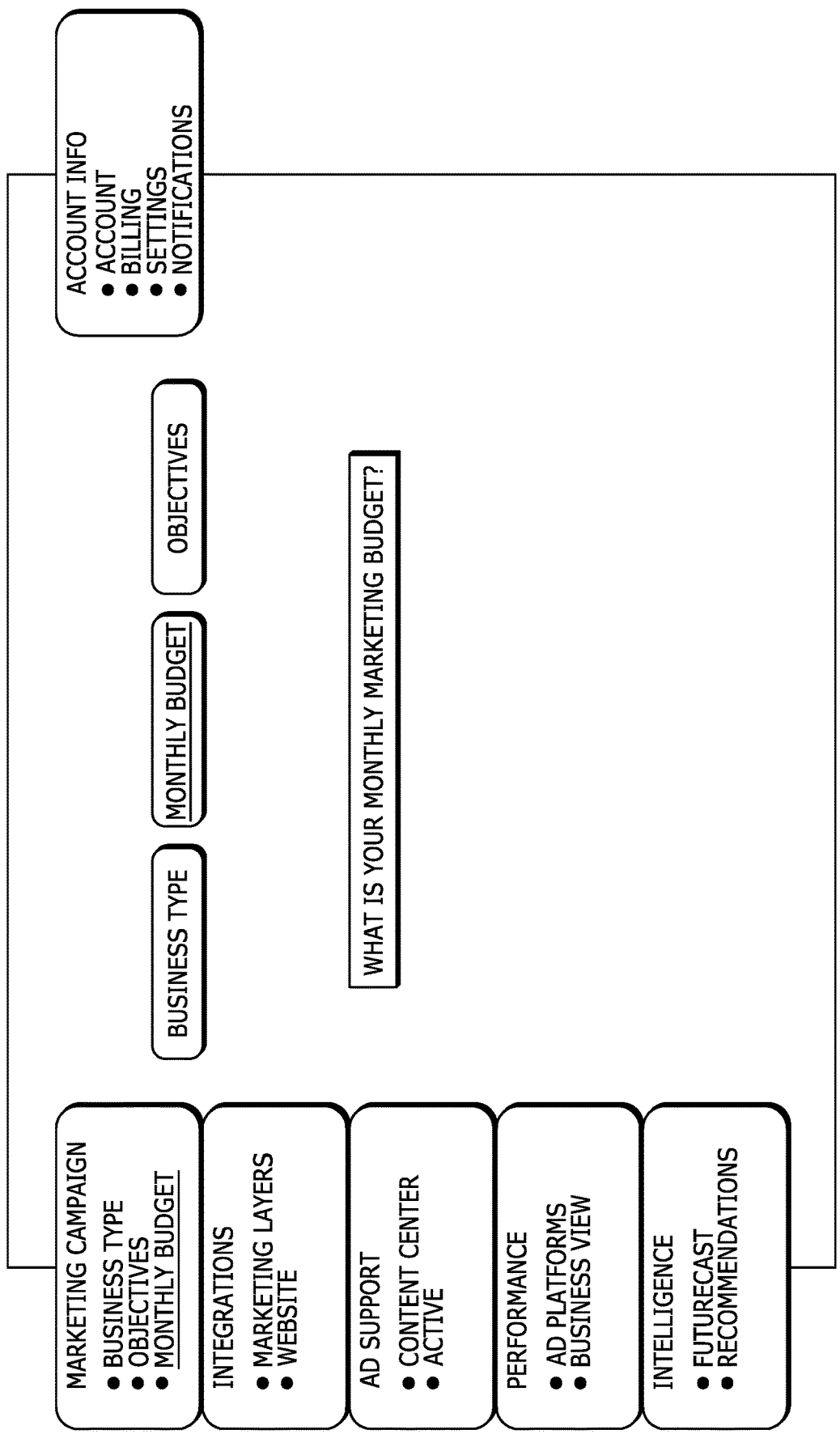
Figure 21:
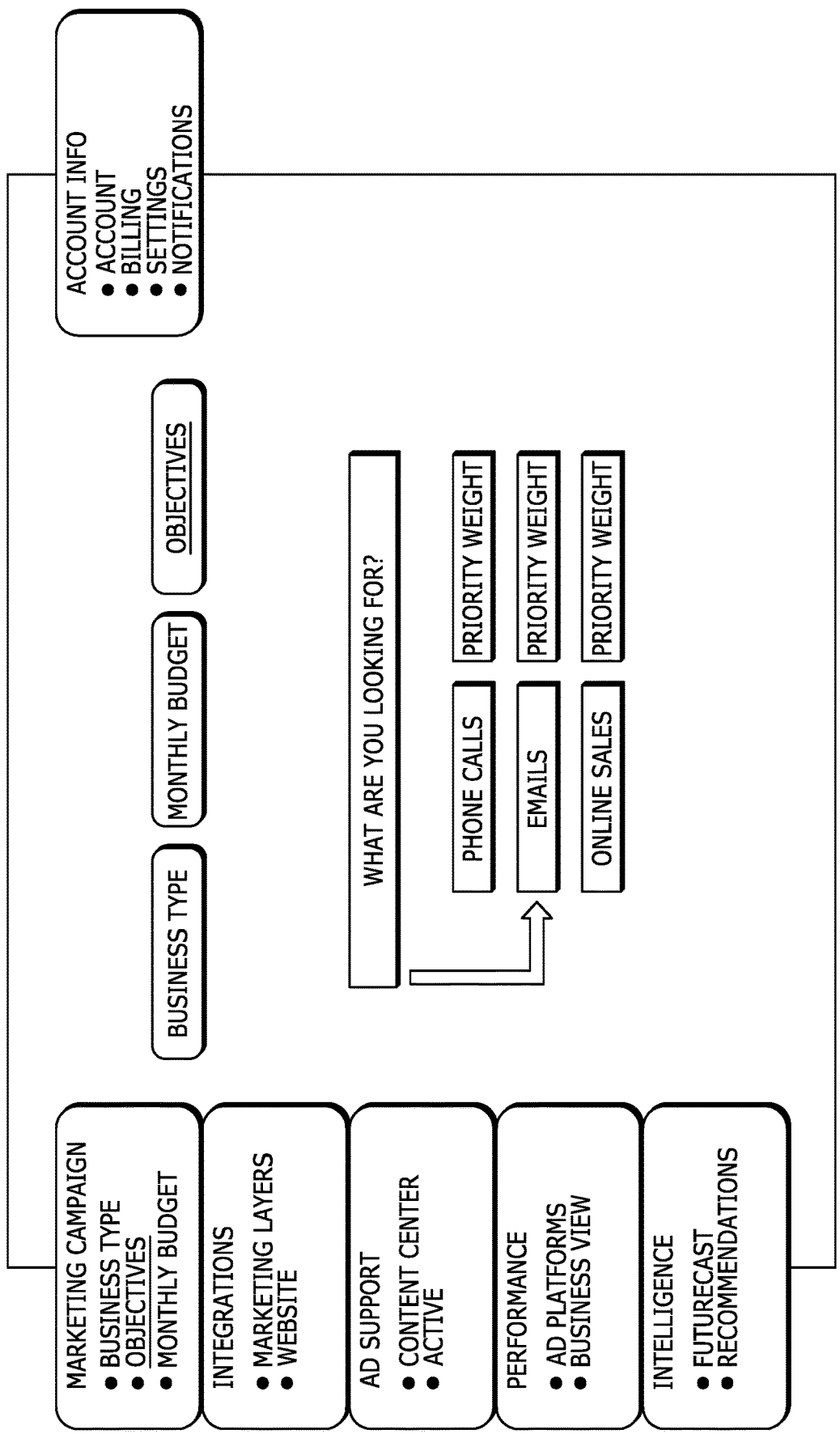

Beginning with FIG. 19, business type selection is illustrated. In FIG. 20, a monthly budget is entered. The monthly budget is the total amount the business wants to budget for marketing related cost monthly. In FIG. 21, the business objectives are entered. The business inputs desired objective(s) with a percentage rate out of one hundred percent (100%). (i.e. Eighty percent (80%) email submissions on a website versus twenty percent (20%) of phone calls)

The marketing channel optimization program recommends starting places for advertisement types based on the budget entered in FIG. 20 and the objectives entered in FIG. 21.

Figure 22:
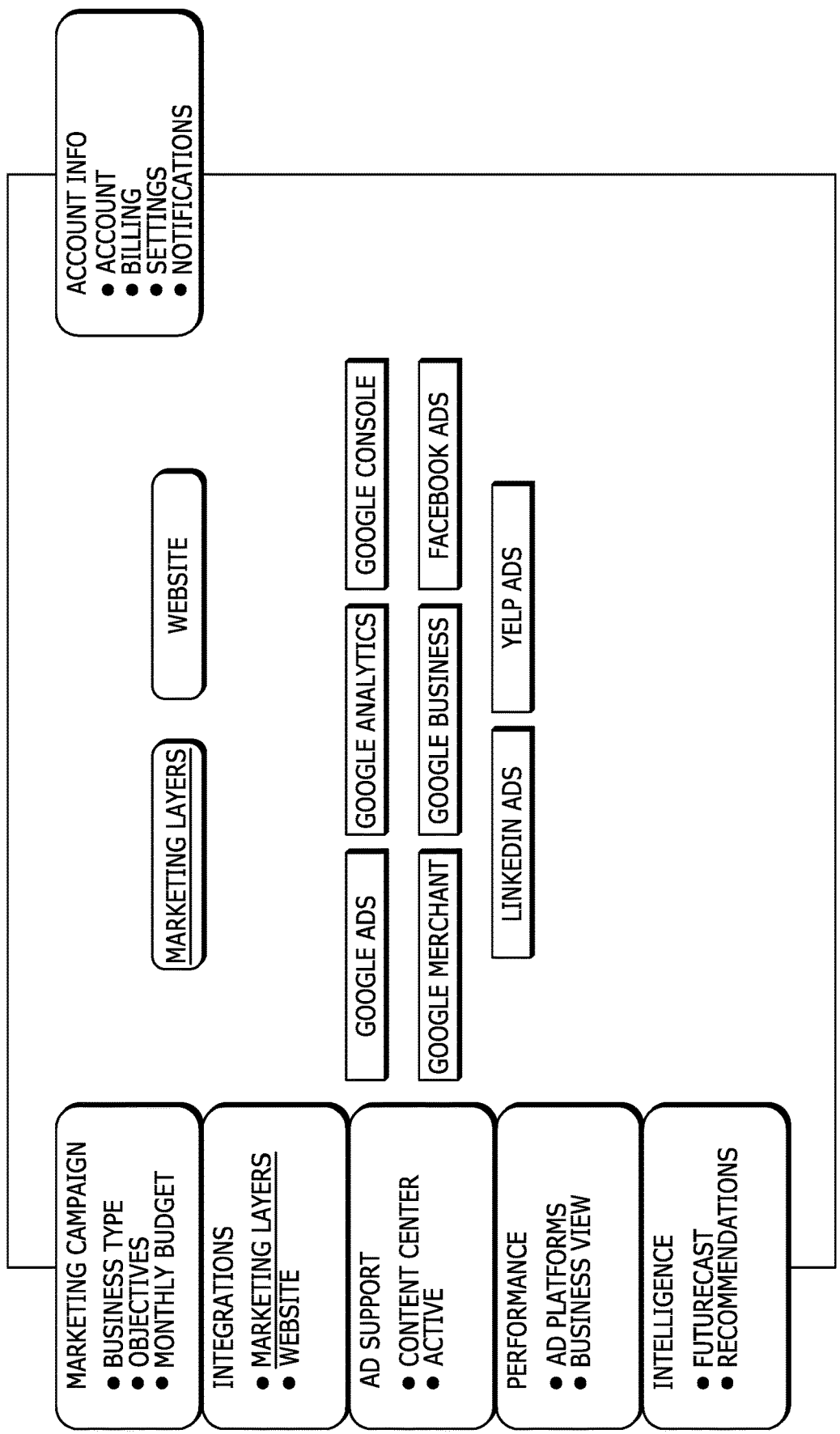

In FIG. 22, the various marketing layers, also referred to as advertising types, are presented to the business. The business, in some embodiments, may be able to click each element and be able to do one of two options. In one option, if the business has an account, the business can give authority for the marketing channel optimization program to maintain account access. In a second option, the business can sign up to create a new account via the marketing channel optimization portal.

Once integrated the marketing channel optimization program includes a plurality of functionality. This functionality may include:

Create new campaigns for regular search advertisements, sales advertisements, video advertisements, business listing advertisements, image based advertisements, video based advertisements and any other advertisement types available.

Extract key performance results including cost per click (CPC), spend, conversions, return on investment (ROI), and impressions.

Integrate various platform analytics.

Figure 23:
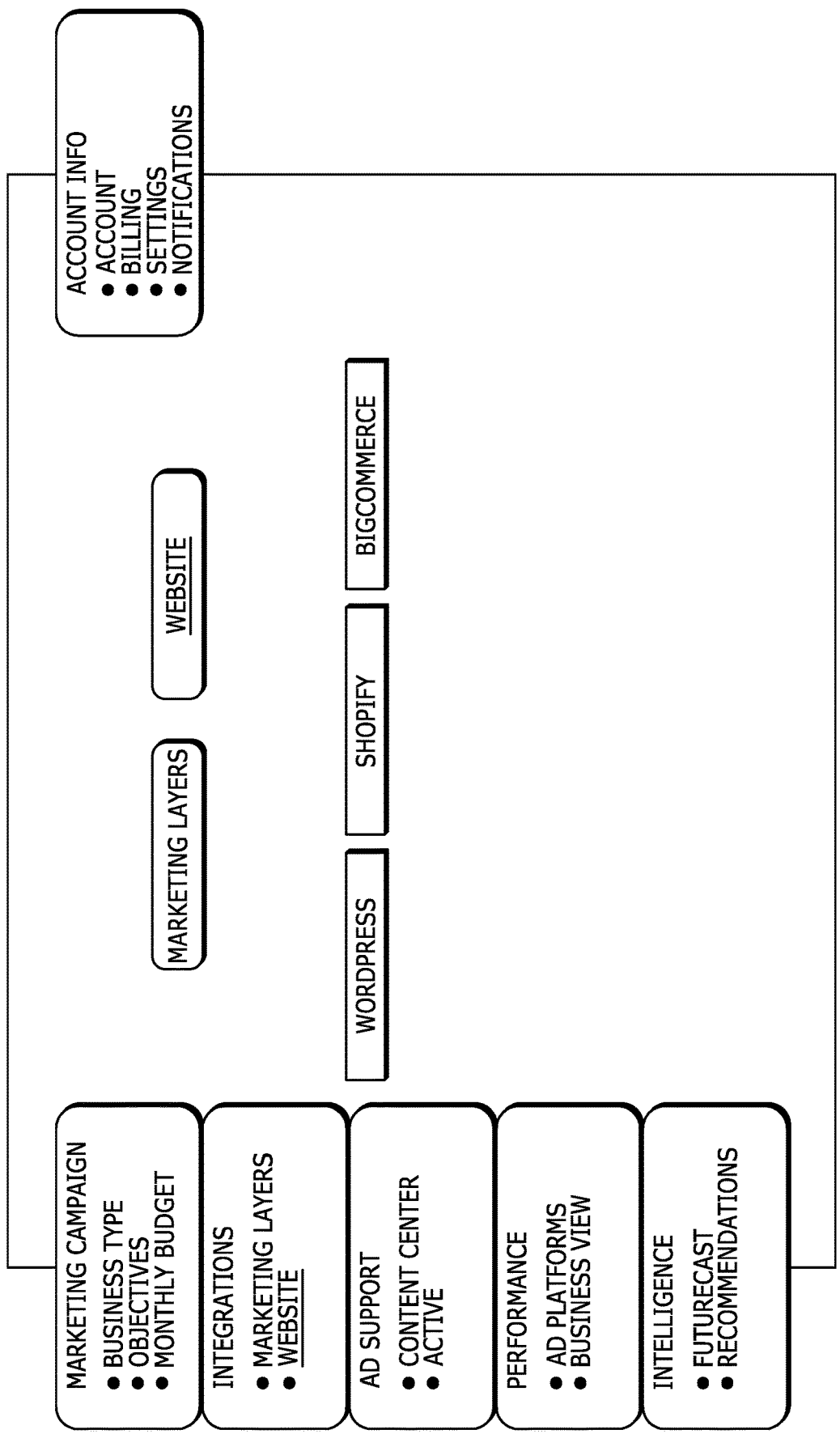

Extract tracking identification (ID) and build tracking code to embed on website (see FIG. 23)

Create the events/goals that will be tracked on the website (see FIG. 23).

In FIG. 23, the business will provide approval/login credentials to access their website management platform for the backend management areas. The marketing channel optimization program will be able to automatically create the analytics tracking code and embed it within the <head> tag of the website if it's not already installed. If it is installed, then the marketing channel optimization program should be given approval to retrieve the website analytics data. The marketing channel optimization program may automatically embed conversion code and track one, or more of a plurality of executions. The executions may include, for example, phone call onclick links, email form submit buttons, and sales for e-commerce sites. At this point all conversion actions on the business's website should be trackable and recorded within the analytics code which was created, or integrated to, as described previously for FIG. 22.

Figure 24:
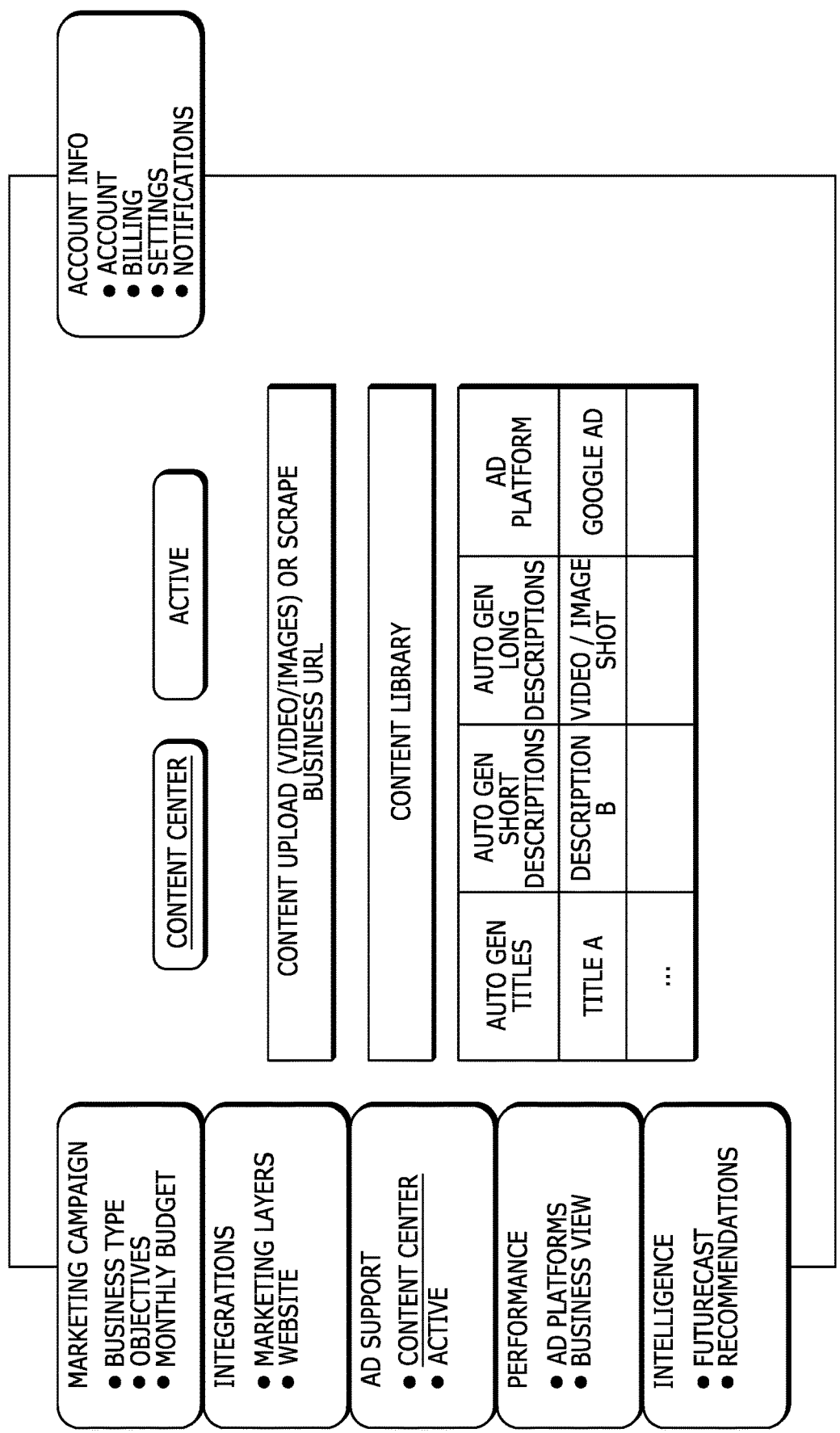

Turning now to FIG. 24, in accordance with some embodiments, in addition to content being scraped from the business's website, a business can upload images/videos for purposes of advertisement. Advertisement copy may be automatically created either from other ads, business's website, or generic phrases saved within the content database. The business further can manually edit/modify as needed. Entries are bounded by typical advertisement channel requirements. Different sub content areas will be based on advertisement marketing channels.

Figure 25:
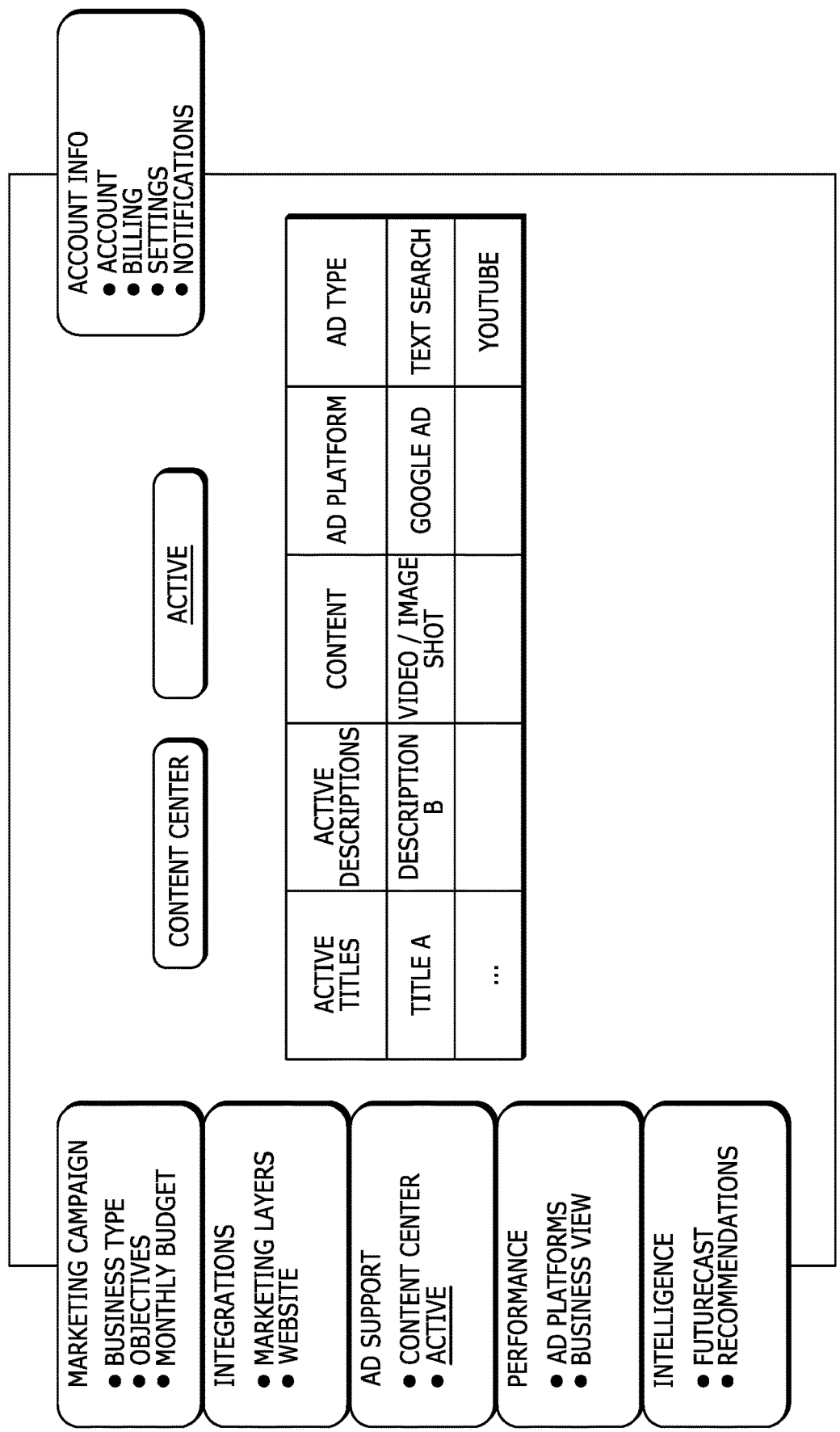

FIG. 25 illustrates the active advertisements and associated content.

Figure 26:
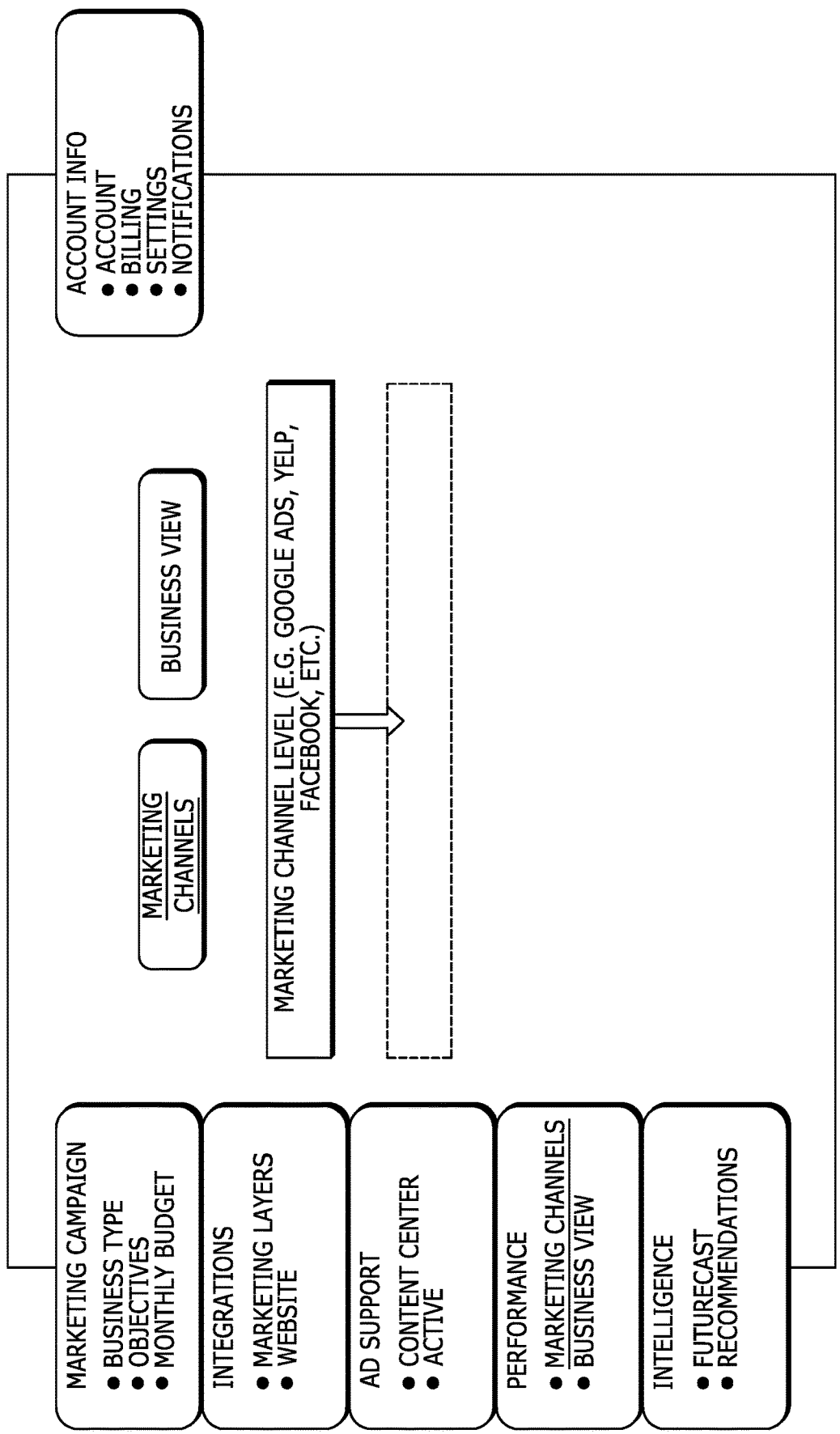

FIG. 26 illustrates campaign metrics from each active ad platform, providing side by side comparisons of money spent.

Figure 27:
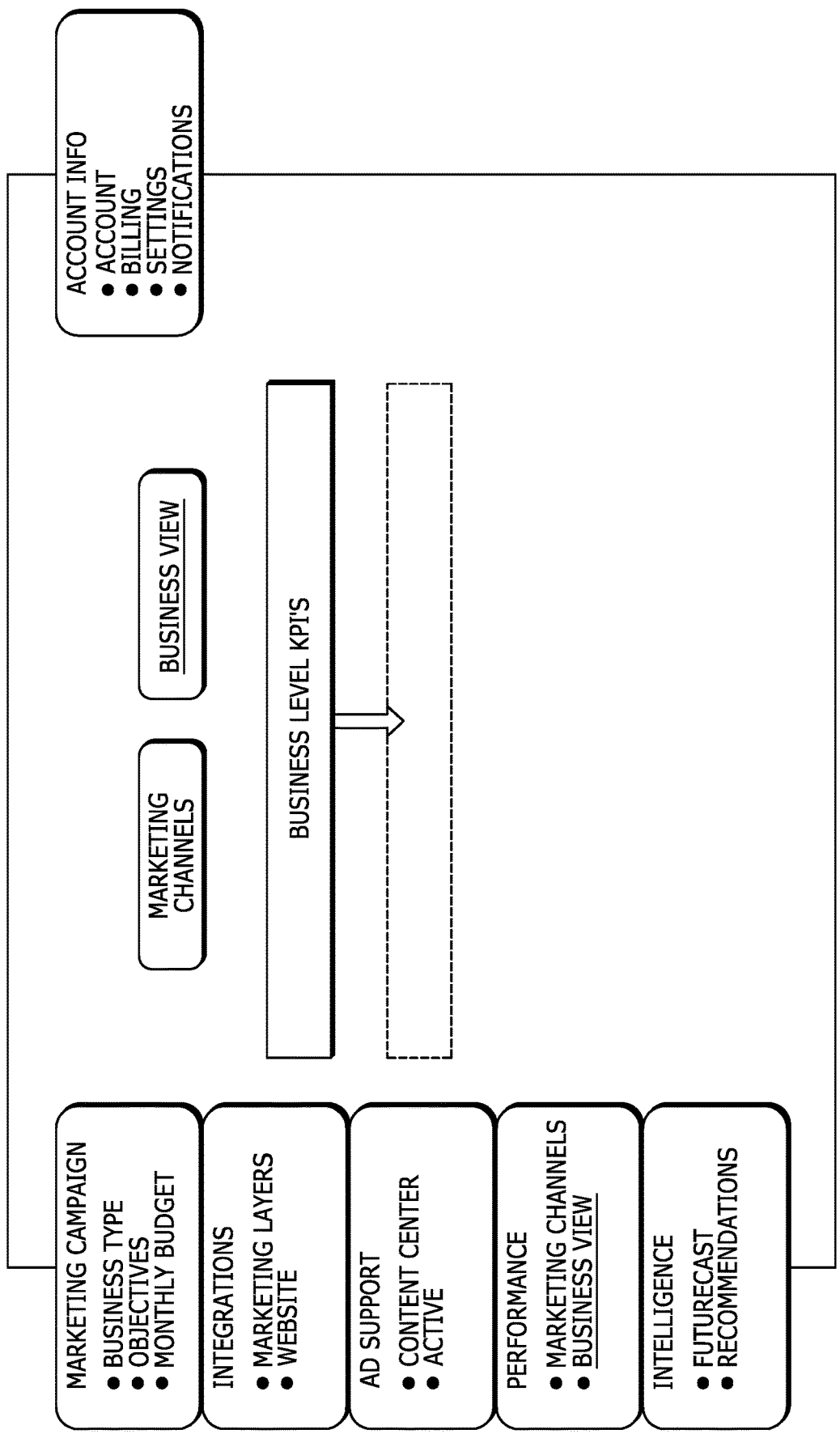

FIG. 27 illustrates a summary of all marketing spend, key performance indicators (KPIs) and conversions, providing a view for marketing channels to be compared.

Figure 28:
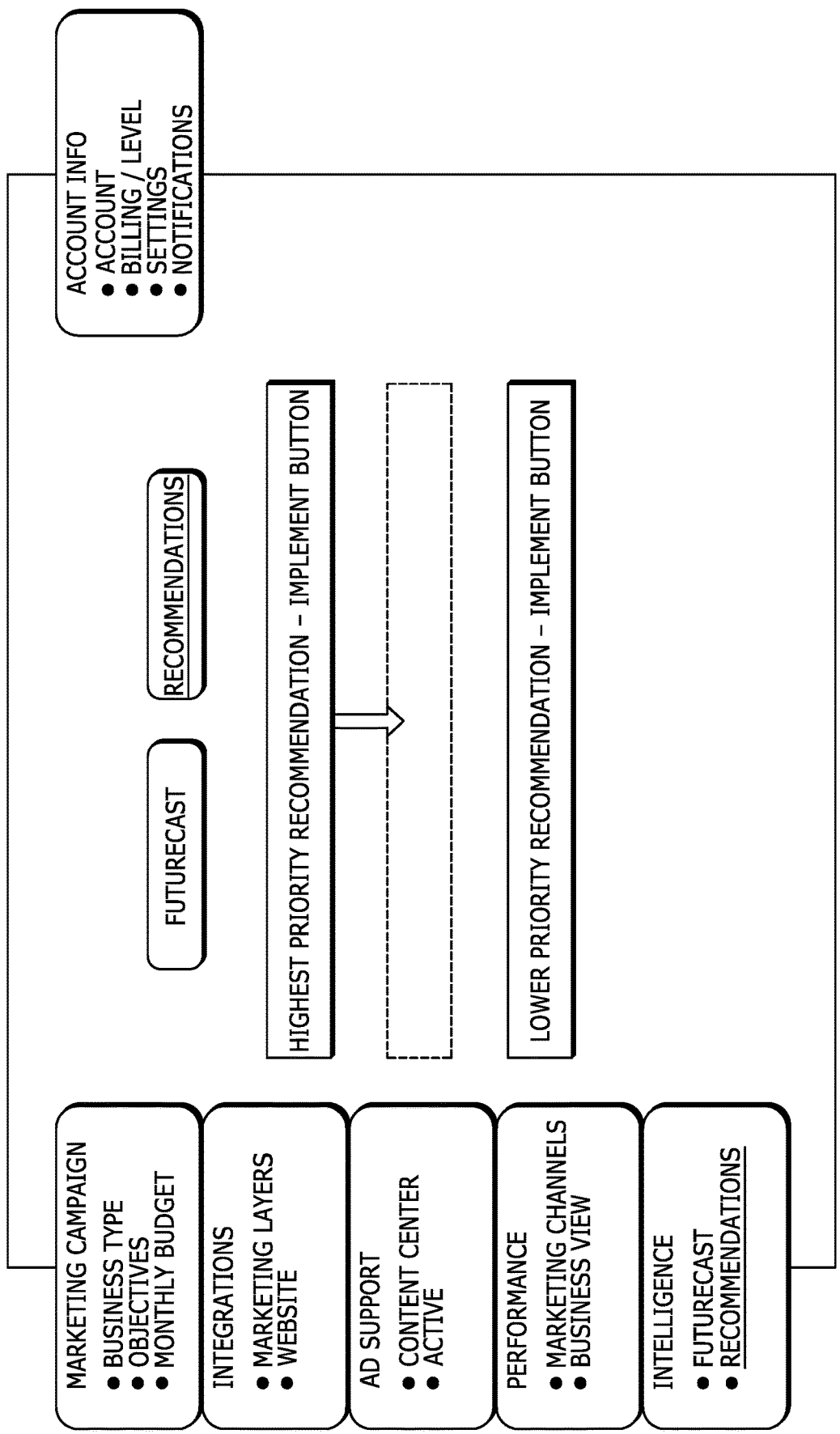

FIG. 28 illustrates a view where the marketing channel optimization program, based on business objectives, provides a list of recommendations. An example of a recommendation may be: "if you spend an extra fifty dollars ($50) during these hours we expect a twenty percent (20%) chance in selling x." or "if you spend fifty dollars ($50) for this time window we expect eight (8) new phone calls with a ninety percent (90%) confidence," and the like.

The present invention automates execution of ad campaigns and re-allocates budget as recommended. The present invention uses machine learning to analyze conversion tracking of an aggregated advertisement performance of a cluster of similar businesses to drive re-allocation of budget in subsequent weeks/months for a given business. It shifts budget to success-based campaigns within that business's associated industry or cluster. It takes budget from underperforming campaigns. Advertisement content is modified based on cluster performance. The present invention automates the execution of marketing platform campaign adjustments. It makes recommendations based on performance within a cluster or industry of similarly categorized businesses, and further projects performance. Recommendations for integrations and new accounts is based on business niche and objectives. The utilization of machine learning and individual business performance based on an aggregate of categorized businesses' performance provides valuable marketing advantage to a business.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential feature or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A system for multi-channel digital marketing optimization comprising:
a plurality of business devices, each business device associated with one of a plurality of businesses, and further each business device communicatively coupled to a marketing optimization computing device for communicating one or more marketing objectives to the marketing optimization computing device;
one or more digital marketing channels, each digital marketing channel communicatively coupled to the marketing optimization computing device for communicating one or more business performance data for each business of the plurality of businesses; and
the marketing optimization computing device comprising:
a memory for storing:
at least one marketing optimization program code, and
at least one marketing optimization data; and
a processor communicatively coupled to the memory, wherein the processor executes the marketing optimization program code to:
create a cluster template by:
determining, for each of the plurality of businesses, a current digital marketing performance metric from the received business performance data, wherein the current digital marketing performance metric includes individual performance metrics for each of the one or more digital marketing channels employed by the corresponding business,
classifying the plurality of businesses into a cluster based at least in part on the received one or more marketing objectives for each business, and
creating a cluster template for each of the one or more digital marketing channels in the cluster, wherein the cluster template for each digital marketing channel is created by mathematically combining the individual performance metrics associated with the corresponding digital marketing channel for each of the plurality of businesses within the cluster,
repeat the cluster template creation steps for a plurality of clusters,
mathematically combine a plurality of cluster templates to create a plurality of target marketing templates,
using one or more machine learning techniques to create a predictor campaign template, based on the collected historical data related to the plurality of cluster templates, wherein each of the plurality of the cluster templates include captured variable ratio spend, a call conversions number, an email conversions number, a sale conversion number, a total conversions number, a call return on investment, an email return on investment, a sale return on investment, and a total average return on investment,
wherein using the one or more machine learning techniques comprises implementing one or more regression models to learn determining optimized variable ratio spend and corresponding delta changes to conversion numbers for the one or more digital marketing channels, by continuously adjusting the corresponding delta changes to adjust a new spend ratio, and
wherein the predictor campaign template includes the determined optimized variable ratio spend and corresponding delta changes to conversion numbers for the one or more marketing objectives associated with the one or more digital marketing channels,
create one or more predictor campaign templates by continuously analyzing the plurality of target marketing templates over a predetermined duration, and
automatically implement and communicate one or more digital marketing campaigns to the one or more digital marketing channels based on the optimized variable ratio spend for the one or more digital marketing channels.

2. The system for multi-channel digital marketing optimization of claim 1, the system further comprising:
a network,
wherein the plurality of business devices are communicatively coupled via the network to the marketing optimization computing device.

3. The system for multi-channel digital marketing optimization of claim 1, wherein the processor further divides the cluster into at least one industry cluster based at least in part on one or more industry trends as a component of performance.

4. The system for multi-channel digital marketing optimization of claim 3, wherein the processor further:
creates an industry level template by:
creating and storing within the marketing optimization data an industry level template based at least in part on a combination of captured and calculated data for the plurality of businesses within the industry cluster;
repeating the industry cluster template creation for a plurality of industry clusters, thereby creating and storing a plurality of industry cluster templates; and
mathematically combining the plurality of industry cluster templates to create the plurality of target marketing templates.

5. The system for multi-channel digital marketing optimization of claim 4, wherein the processor further mathematically combines the plurality of cluster templates and the industry cluster templates to create the plurality of target marketing templates.

6. The system for multi-channel digital marketing optimization of claim 4, wherein the processor further periodically creates one or more regression models using machine learning on the historical data of the plurality of cluster templates and the industry cluster templates.

7. The system for multi-channel digital marketing optimization of claim 6, wherein the processor further creates one or more campaign recommendations using the one or more regression models.

8. The system for multi-channel digital marketing optimization of claim 1, wherein the processor further continuously reclassifies the plurality of businesses into a plurality of clusters based at least in part on one or more marketing objectives.

9. The system for multi-channel digital marketing optimization of claim 1, wherein the processor classifies the plurality of businesses using a machine learning classifier algorithm.

10. The system for multi-channel digital marketing optimization of claim 1, wherein the processor further periodically creates the one or more regression models using machine learning on the historical data of the plurality of cluster templates.

11. The system for multi-channel digital marketing optimization of claim 10, wherein the processor further creates one or more campaign recommendations using the one or more regression models.

12. The system for multi-channel digital marketing optimization of claim 1, further comprising:
the one or more digital marketing channels communicatively coupled to the marketing optimization computing device for receiving and displaying the one or more digital marketing campaigns, wherein the one or more digital marketing campaigns comprise digital marketing advertisements.

13. A method for multi-channel digital marketing optimization within a system comprising a plurality of business devices, each business device associated with one of a plurality of businesses and each business device communicatively coupled to a marketing optimization computing device for communicating one or more marketing objectives to the marketing optimization computing device, and one or more digital marketing channels, each digital marketing channel communicatively coupled to the marketing optimization computing device for communicating one or more business performance data for each business of the plurality of businesses, the method comprising:
creating, by a processor in the marketing optimization computing device, a cluster template by:
determining, for each of the plurality of businesses, a current digital marketing performance metric from the received business performance data, wherein the current digital marketing performance metric includes individual performance metrics for each of the one or more digital marketing channels employed by the corresponding business,
classifying the plurality of businesses into a cluster based at least in part on the received one or more marketing objectives for each business, and
creating a cluster template for each of the one or more digital marketing channels in the cluster, wherein the cluster template for each digital marketing channel is created by mathematically combining the individual performance metrics associated with the corresponding digital marketing channel for each of the plurality of businesses within the cluster;
repeating, by the processor, the cluster template creation steps for a plurality of clusters;
mathematically combining, by the processor, a plurality cluster templates to create a plurality of target marketing templates;
using one or more machine learning techniques, by the processor, for creating a predictor campaign template, based on the collected historical data related to the plurality of cluster templates, wherein each of the plurality of the cluster templates include captured variable ratio spend, a call conversions number, an email conversions number, a sale conversion number, a total conversions number, a call return on investment, an email return on investment, a sale return on investment, and a total average return on investment, wherein using the one or more machine learning techniques comprises implementing one or more regression models to learn determining optimized variable ratio spend and corresponding delta changes to conversion numbers for the one or more digital marketing channels, by continuously adjusting the corresponding delta changes to adjust a new spend ratio, and
wherein the predictor campaign template includes the determined optimized variable ratio spend and corresponding delta changes to conversion numbers for the one or more marketing objectives associated with the one or more digital marketing channels;
creating, by the processor, one or more predictor campaign templates by continuously analyzing the plurality of target marketing templates over a predetermined duration, and
automatically implementing and communicating, by the processor, one or more digital marketing campaigns to the one or more digital marketing channels based on the optimized variable ratio spend for the one or more digital marketing channels.

14. The method for multi-channel digital marketing optimization of claim 13, further comprising dividing, by the processor, the cluster into at least one industry cluster based at least in part on one or more industry trends as a component of performance.

15. The method for multi-channel digital marketing optimization of claim 14, further comprising:
creating and storing, by the processor, within the marketing optimization data storage an industry level template based at least in part on a combination of captured and calculated data for the plurality of businesses within the industry cluster;

repeating, by the processor, the industry cluster template creating and storing for a plurality of industry clusters, thereby creating and storing a plurality of industry cluster templates; and mathematically combining, by the processor, the plurality of industry cluster templates to create the plurality of target marketing templates.

16. The method for multi-channel digital marketing optimization of claim 15, further comprising mathematically combining, by the processor, the plurality of cluster templates and the industry cluster templates to create the plurality of target marketing templates.

17. The method for multi-channel digital marketing optimization of claim 15, further comprising periodically creating, by the processor, one or more regression models using machine learning on the historical data of the plurality of cluster templates and the industry cluster templates.

18. The method for multi-channel digital marketing optimization of claim 17, further comprising creating, by the processor, one or more campaign recommendations using the one or more regression models.

19. The method for multi-channel digital marketing optimization of claim 13, further comprising continuously reclassifying, by the processor, the plurality of businesses into a plurality of clusters based at least in part on one or more marketing objectives.

20. The method for multi-channel digital marketing optimization of claim 13, further comprising classifying, by the processor, the plurality of businesses using a machine learning classifier algorithm.

21. The method for multi-channel digital marketing optimization of claim 13, further comprising periodically creating, by the processor, the one or more regression models using machine learning on the historical data of the plurality of cluster templates.

22. The method for multi-channel digital marketing optimization of claim 21, further comprising creating, by the processor, one or more campaign recommendations using the one or more regression models.

23. The method for multi-channel digital marketing optimization of claim 13, further comprising:

receiving and displaying, by the one or more digital marketing channels, the one or more digital marketing campaigns, wherein the one or more digital marketing campaigns comprise digital marketing advertisements.

* * * * *